United States Patent [19]
Maucher

[11] Patent Number: 5,632,365
[45] Date of Patent: May 27, 1997

[54] FRICTION CLUTCH

[75] Inventor: Paul Maucher, Sasbach, Germany

[73] Assignee: Luk Lamellen und Kupplungsbau GmbH, Bühl, Germany

[21] Appl. No.: 413,978

[22] Filed: Mar. 28, 1995

[30] Foreign Application Priority Data

Mar. 29, 1994 [DE] Germany .................. 44 10 837.0

[51] Int. Cl.⁶ ........................................ F16D 13/75
[52] U.S. Cl. ..................... 192/70.25; 192/89.24; 192/89.25; 192/109 A
[58] Field of Search .............. 192/70.25, 89.24, 192/89.25, 111 A, 109 A

[56] References Cited

U.S. PATENT DOCUMENTS

| | | |
|---|---|---|
| 3,261,439 | 7/1966 | Binder .................. 192/107 C |
| 4,207,972 | 6/1980 | Zeidler . |
| 4,615,424 | 10/1986 | Kohler . |
| 4,720,002 | 1/1988 | Kitano et al. .......... 192/70.25 X |
| 4,754,860 | 7/1988 | Fukutake et al. ........ 192/70.25 |
| 4,832,164 | 5/1989 | Flotow . |
| 5,029,687 | 7/1991 | Asada et al. .......... 192/70.25 X |
| 5,069,322 | 12/1991 | Mizukami et al. ........ 192/70.25 |
| 5,180,335 | 1/1993 | Maucher et al. . |
| 5,431,268 | 7/1995 | Mizukami et al. ........ 192/70.25 |
| 5,450,934 | 9/1995 | Maucher .............. 192/70.25 |
| 5,513,735 | 5/1996 | Uenohara ............ 192/70.25 X |
| 5,513,736 | 5/1996 | Mizukami ............ 192/70.25 X |

*Primary Examiner*—Andrea L. Pitts
*Attorney, Agent, or Firm*—Darby & Darby

[57] ABSTRACT

A friction clutch which is provided with a system to compensate for wear upon the friction linings of the clutch disc and, if necessary, for wear upon certain other parts employs one or more diaphragm springs or other energy storing elements which assist in the disengagement of the clutch so that the disengaging force is relatively low and/or that such force fluctuates within a relatively narrow range. The energy storing element or elements can operate in parallel with the clutch spring and can be installed between the housing of the friction clutch and the clutch spring. The disengaging force of the energy storing element or elements can be assisted by the bias of resilient segments between the friction linings of the clutch disc.

56 Claims, 6 Drawing Sheets

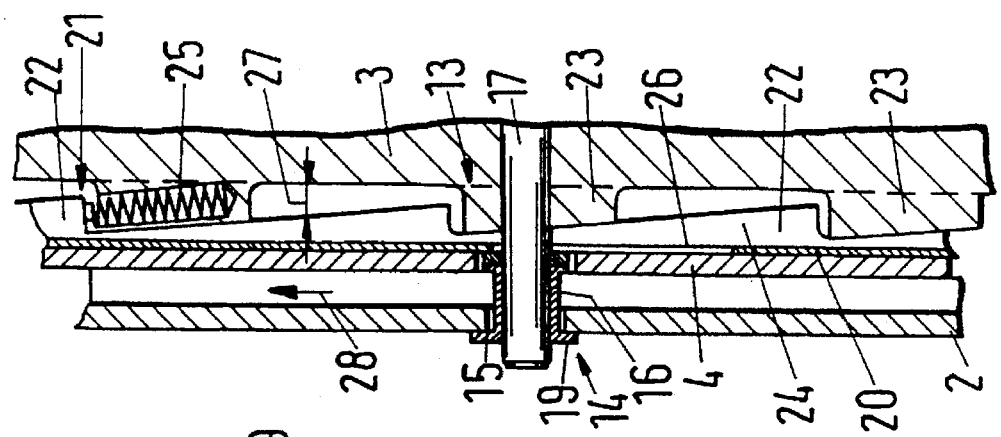
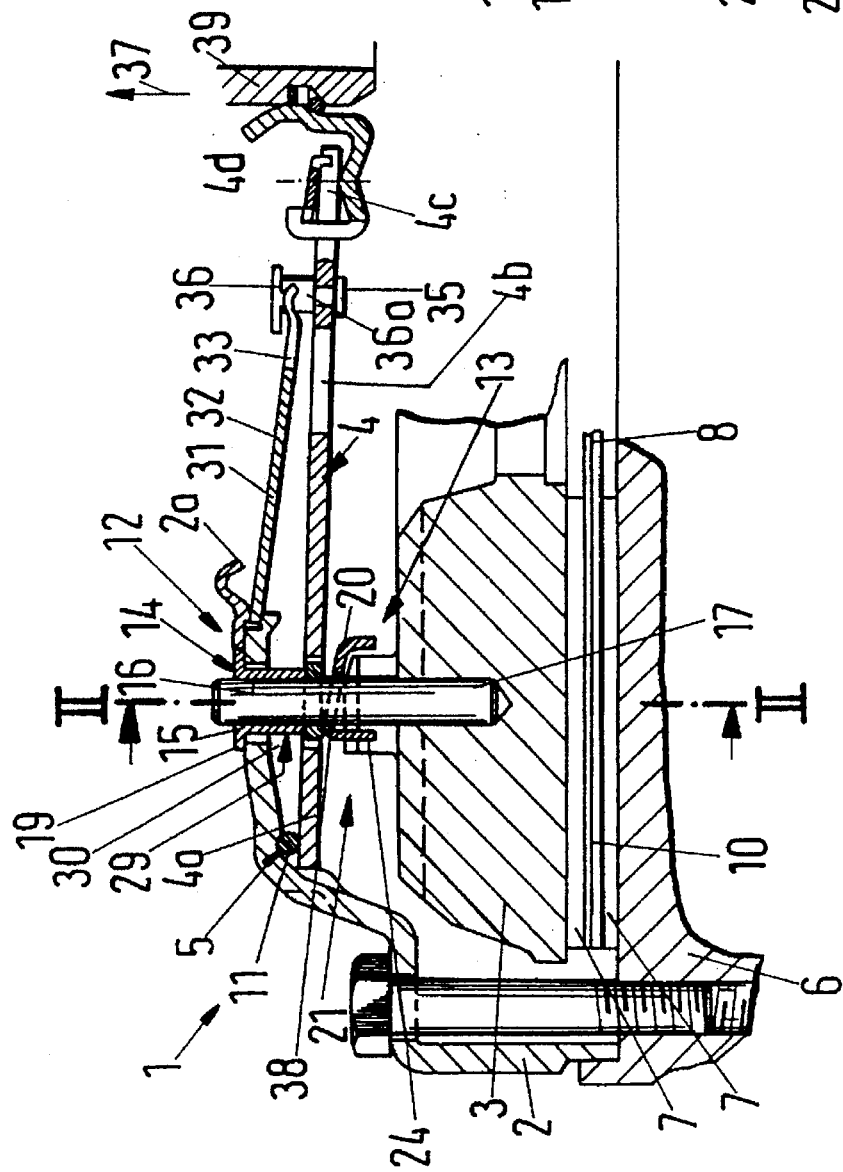

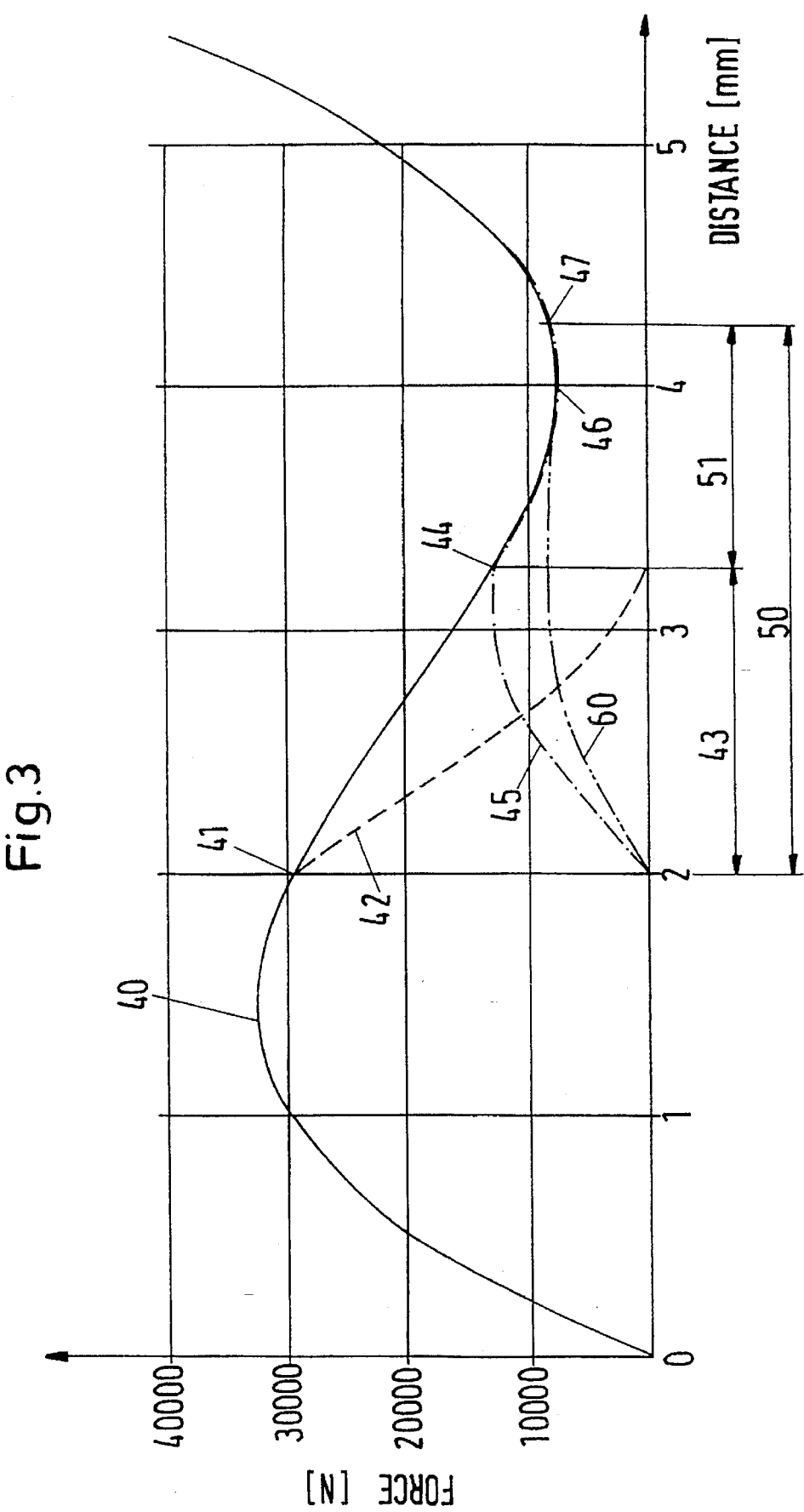

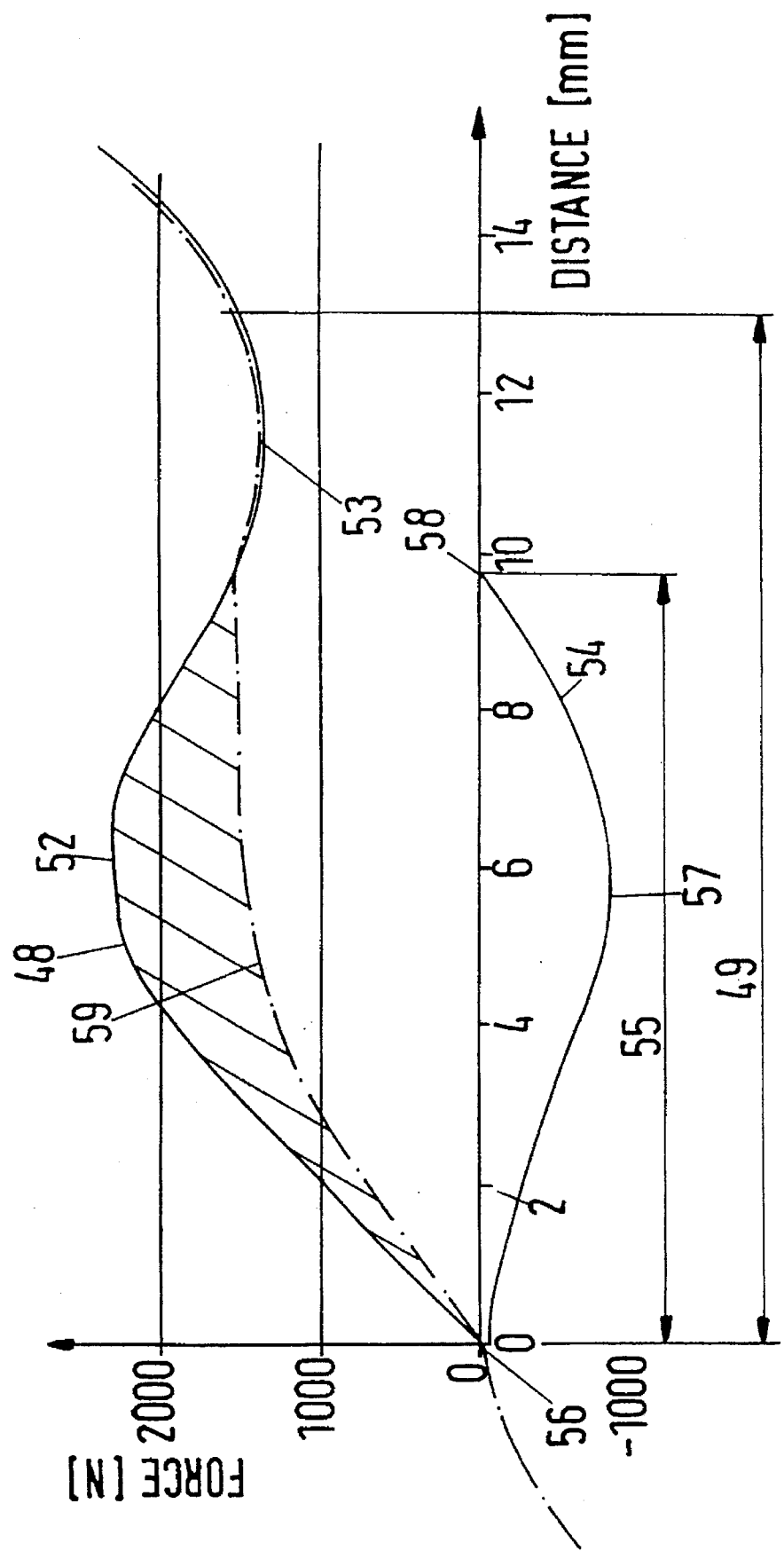

FRICTION CLUTCH

BACKGROUND OF THE INVENTION

The invention relates to clutches in general, and more particularly to improvements in friction clutches. Still more particularly, the invention relates to improvements in friction clutches which can be utilized with advantage in power trains between the engines and the wheels of motor vehicles.

A friction clutch of the type to which the present invention pertains normally employs a housing or cover which receives torque from the prime mover of a vehicle, for example, by way of a counterpressure plate (such as a flywheel) which is driven by the output element (e.g., a camshaft or a crankshaft) of a combustion engine. An axially movable pressure plate is installed between the housing and the counterpressure plate and is caused to bias a clutch disc against the counterpressure plate when the clutch is engaged. The clutch disc then transmits torque to the input shaft of a transmission or another torque receiving part in the power train of the vehicle. The means for biasing the pressure plate toward the counterpressure plate (to thus clamp the clutch disc between the two plates in the engaged condition of the clutch) normally comprises a clutch spring (particularly a diaphragm spring) which reacts against the housing and bears against the adjacent side of the pressure plate when the clutch is engaged. The pressure plate shares the angular movements of the housing and of the counterpressure plate; to this end, the pressure plate is normally coupled to the housing by leaf springs which permit the pressure plate to move toward and away from the counterpressure plate in the direction of the common axis of the housing and the counterpressure plate but prevents the pressure plate from turning relative to the housing.

It is further known to provide a friction clutch of the above outlined character with a unit which can compensate (preferably automatically) at least for wear upon friction linings which form part of the clutch disc and are in frictional contact with the pressure plate and the counterpressure plate in the at least partially engaged condition of the clutch.

Friction clutches of the aforedescribed type are described and shown, for example, in published German patent application Serial No. 42 39 289 as well as in the prior art which is referred to in such application.

An advantage of the wear compensating unit is that it renders it possible to bias the pressure plate and the counterpressure plate of the friction clutch against the adjacent friction linings of the clutch disc with a considerable force even after the friction linings have already undergone extensive wear. Another purpose of the wear compensating unit is to render it more likely that the clutch can be disengaged in response to the application of a relatively small disengaging force, namely a disengaging force whose maximum value can be said to be within an acceptable (relatively low) range, as well as to establish circumstances under which the disengaging force is likely to remain at least substantially constant during the useful life of the clutch. The useful life of the clutch is determined, to a considerable degree, by the useful life of the friction linings on the clutch disc even though certain other factors (such as the wear upon the pressure plate, the wear upon the counterpressure plate and/or the wear upon the clutch spring or springs) are also apt to affect the life expectancy of the friction clutch.

The utilization of diaphragm springs as a means for biasing the pressure plate against the adjacent friction linings of the clutch disc in the engaged condition of the friction clutch has been found to exhibit the advantage that the clutch can be disengaged in response to the application of a relatively small (maximum) disengaging force and that the disengaging force need not fluctuate within a relatively wide range. The nature and the mounting of the diaphragm spring (which serves to bias the pressure plate against the clutch disc in the engaged condition of the friction clutch) are such that the magnitude of the force being applied by the diaphragm spring decreases at least during the major part of the distance that must be covered by the pressure plate for the purpose of disengagement of the clutch, i.e., the diaphragm spring exhibits a degressive force-to-distance characteristic.

However, the aforedescribed conventional friction clutches also exhibit certain serious drawbacks. Thus, even if the means for engaging the clutch employs one or more diaphragm springs, the magnitude of the disengaging force which must be applied in order to move the pressure plate away from the clutch disc often varies within an excessively wide range. As a rule, the disengaging force which must be applied to move the pressure plate away from the counterpressure plate at first rises toward an undesirably high maximum value to thereupon gradually decrease to a minimum value. The difference between the maximum and minimum values of such disengaging force is considerable and, in many instances, well above the acceptable range. As a rule, the ratio of the maxima and minima of disengaging forces which must be applied in heretofore known friction clutches of the above outlined character is between 1.5 and 2.5 or even higher.

The need for the application of very pronounced disengaging forces is undesirable irrespective of whether the clutch is being manipulated by the operator of the vehicle or automatically, e.g., by a servomotor. If the clutch is to be disengaged by a motor, the dimensions of such motor are proportional to the magnitude of the disengaging force which is to be applied in order to move the pressure plate away from the counterpressure plate. The same applies for the energy requirements of the motor. Moreover, it is necessary to employ stable and hence bulky and more expensive means for transmitting motion in order to disengage the clutch. Rather bulky, heavy and expensive motion transmitting means are necessary on the additional ground that such parts must withstand pronounced deforming stresses during transmission of large forces from the disengaging motor to the pressure plate in order to disengage the clutch. Even the elasticity of the motion transmitting parts must be limited to a minimum in order to ensure predictable disengagement of the clutch against the opposition of the diaphragm spring(s).

OBJECTS OF THE INVENTION

An object of the invention is to provide a friction clutch which is constructed and assembled in such a way that it can be disengaged in response to the application of relatively small forces.

Another object of the invention is to provide a friction clutch which can be disengaged in response to the application of relatively small forces whose magnitude varies within a narrow range.

A further object of the invention is to provide a friction clutch which can be disengaged in response to the application of relatively small and relatively constant forces at least during a major part of disengagement of the pressure plates from the clutch disc.

An additional object of the invention is to provide a friction clutch which is constructed and assembled in such a way that it can be disengaged in response to the application of relatively small disengaging forces the magnitude of which varies within a narrow range and without abrupt peaks or valleys.

Still another object of the invention is to provide a clutch which can be disengaged by forces the difference between the maximum and minimum values of which is much smaller than in heretofore known clutches and need not exceed (and can be even less than) 1.5.

A further object of the invention is to provide a novel and improved friction clutch which exhibits the above outlined desirable characteristics and which need not be bulkier, heavier and/or more expensive than heretofore known friction clutches.

Another object of the invention is to provide a novel and improved combination of energy storing elements for use in the above outlined friction clutch.

An additional object of the invention is to provide a novel and improved combination of cooperating diaphragm springs for use in the above outlined friction clutch.

Still another object of the invention is to provide a power train, particularly for use in motor vehicles, which embodies a friction clutch of the above outlined character.

A further object of the invention is to provide a novel and improved combination of components, including means for compensating for wear upon the friction linings and/or pressure plates and/or other elements, for use in the above outlined friction clutch.

Another object of the invention is to provide a novel and improved combination of energy storing elements which exhibit superior force-to-distance characteristics during engagement as well as during disengagement of the above outlined friction clutch.

An additional object of the invention is to provide a novel and improved method of reducing the magnitude and/or the fluctuations of forces which are necessary to disengage the above outlined friction clutch.

Still another object of the invention is to provide a friction clutch which can be utilized in presently known motor vehicles and for other purposes as a superior substitute for heretofore known friction clutches.

SUMMARY OF THE INVENTION

One feature of the present invention resides in the provision of an engageable and disengageable friction clutch which can be utilized with particular advantage in the power trains of motor vehicles and comprises a housing or cover adapted to rotate about a predetermined axis, means for rotating the housing including a counterpressure plate (e.g., a flywheel receiving torque from the camshaft or crankshaft or another rotary output element of a prime mover, such as the combustion engine of a motor vehicle) which is rotatable about the aforementioned axis, and a pressure plate which is coaxial and rotatable with and is disposed between the housing and the counterpressure plate and is movable in the direction of the aforementioned common axis. The friction clutch further comprises a clutch disc which is coaxial with and is disposed between the pressure plate and the counterpressure plate and is normally provided with friction linings subject to wear upon repeated progressing frictional contact with and repeated progressing reduction of frictional contact with the respective plates in response to axial movement of the pressure plate toward and away from the counterpressure plate, and means for engaging the clutch including at least one clutch spring serving to bias the pressure plate against the clutch disc in the engaged condition of the clutch. The improved friction clutch still further comprises means (e.g., prongs provided on the at least one clutch spring and a bearing which can be moved to change the orientation and hence the bias of the at least one clutch spring) for reducing the bias of the at least one clutch spring upon the pressure plate to thus disengage the clutch, at least one at least temporarily stressed energy storing element which operates in parallel with the at least one clutch spring to generate forces promoting (at least in part) the disengagement of the clutch, and means for preferably automatically compensating for wear at least upon the clutch disc, i.e., at least for wear upon the friction linings of the clutch disc.

The pressure plate is installed for limited axial movement between the housing and the counterpressure plate.

The at least one energy storing element can be constructed and installed to exhibit a progressive (rising or growing) force-to-distance characteristic, at least during a portion or stage of movement of the pressure plate in a direction to disengage the friction clutch.

The at least one energy storing element and/or the at least one clutch spring can include a diaphragm spring.

If the at least one clutch spring is or includes a diaphragm spring, such diaphragm spring is preferably designed to include an annular portion (such annular portion bears upon the pressure plate at least in the engaged condition of the clutch) and prongs which extend from the annular portion substantially toward the common axis of the housing and pressure plates (i.e., at least substantially radially of the annular portion) and can form part of the means for reducing the bias of the at least one clutch spring upon the pressure plate.

The at least one clutch spring can be designed and mounted to have a degressive force-to-distance characteristic, at least during at least one portion or stage of movement of the pressure plate away from the counterpressure plate.

The pressure plate covers a predetermined distance during movement away from the counterpressure plate to disengage the clutch. The mounting of the pressure plate can be such that the pressure plate applies to the clutch disc a decreasing force during movement of the pressure plate through a first portion of the predetermined distance and that the clutch disc is spaced apart from (i.e., its friction linings are not in frictional contact with) the pressure plates during movement of the pressure plate through a second portion of the predetermined distance. The arrangement can be such that the at least one energy storing element exhibits a positive force-to-distance characteristic during movement of the pressure plate through the first portion of the predetermined distance. The at least one energy storing element can be used to generate forces which promote the disengagement of the clutch during movement of the pressure plate through the entire first portion of the predetermined distance and/or during a part of movement of the pressure plate through the second portion of the predetermined distance.

The at least one energy storing element can bear (directly or indirectly) against the housing or against the bias reducing means and then reacts (directly or indirectly) against the bias reducing means or against the housing. For example, the at least one energy storing element can bear (directly or indirectly) against the housing or against the at least one clutch spring and then reacts (directly or indirectly) against the at least one clutch spring or against the housing.

The at least one energy storing element can be stressed in the engaged condition of the clutch in such a way that it does not exert any force or any appreciable force in the direction of the common axis of the pressure plate and the counterpressure plate. Alternatively, the at least one energy storing element can be installed to exert a relatively small force in the direction of the common axis when the clutch is engaged.

It is often desirable to select the at least one energy storing element in such a way that it exhibits a substantially sinusoidal force-to-distance characteristic curve and is subjected to a minimum stress (or to a stress not appreciably above the minimum stress) in the engaged condition of the clutch.

It is also possible to select and install the at least one energy storing element in such a way that it is stressed in the engaged condition of the clutch to generate a force acting in the direction of the common axis of the pressure plate and the counterpressure plate.

The clutch disc can further comprise resilient means installed between the friction linings and serving to urge the friction linings in the direction of the aforementioned axis and away from each other (i.e., to urge one friction lining or one set of friction linings toward the pressure plate and to urge the other friction lining or the other set of friction linings toward the counterpressure plate). Such resilient means render it possible to achieve gradual engagement and disengagement of the friction clutch.

If the at least one energy storing element comprises or constitutes a diaphragm spring, the friction clutch can further comprise means for tiltably mounting the diaphragm spring on the housing. The arrangement can be such that the means for tiltably mounting is designed to articulately connect the housing with a radially outer portion of the diaphragm spring.

Furthermore, and if the at least one energy storing element includes or constitutes a diaphragm spring, a radially inner portion of such diaphragm spring can act upon the bias reducing means of the improved clutch.

Another feature of the invention resides in the provision of an engageable and disengageable friction clutch which can be utilized with particular advantage in the power trains between the prime movers and the wheels of motor vehicles. The clutch comprises a housing which is rotatable about a predetermined axis, means for rotating the housing including a counterpressure plate (such as a flywheel adapted to receive torque from the output element of a combustion engine in a motor vehicle) which is rotatable about the predetermined axis, and a pressure plate which is coaxial with and is rotatable with and is disposed between the housing and the counterpressure plate and is movable within limits in the direction of the common axis of the housing and counterpressure plate. The friction clutch further comprises a clutch disc which is coaxial with and is disposed between the pressure plate and the counterpressure plate and has friction linings subject to wear upon repeated progressing frictional contact and repreated progressing reduction of frictional contact with the pressure plate and the counterpressure plate in response to axial movement of the pressure plate toward and away from the counterpressure plate, means for moving the pressure plate including at least one first diaphragm spring serving to bias the pressure plate against the clutch disc in the engaged condition of the clutch, means for reducing the bias of the at least one first diaphragm spring upon the pressure plate to thus disengage the clutch, at least one stressed second diaphragm spring which is operative in parallel with the at least one first diaphragm spring to generate forces promoting at least in part the disengagement of the clutch, and means for automatically compensating for wear at least upon the friction linings. The wear compensating means includes means for adjusting the bias of the at least one first diaphragm spring upon the pressure plate.

The at least one second diaphragm spring is or can be constructed and arranged to exhibit a progressive force-to-distance characteristic at least during at least one portion or stage of movement of the pressure plate in a direction to disengage the clutch.

The at least one first diaphragm spring can include an annular portion and projections (e.g., in the form of prongs) extending from the annular portion substantially toward the axis (i.e., radially inwardly of the annular portion) and forming part of the means for reducing the bias of the at least one first diaphragm spring (clutch spring) upon the pressure plate.

The at least one first diaphragm spring can have a degressive force-to-distance characteristic, at least during at least one portion or stage of movement of the pressure plate away from the counterpressure plate.

The pressure plate covers a predetermined distance during movement away from the counterpressure plate to disengage the clutch. The arrangement is or can be such that the pressure plate applies to the clutch disc a decreasing force during movement through a first portion of the predetermined distance in a direction away from the counterpressure plate, and that the clutch disc is spaced apart from the pressure plate and the counterpressure plate during movement of the pressure plate through a second portion of the predetermined distance on its way away from the counterpressure plate. The at least one second diaphragm spring which is put to use in such friction clutch can be designed to exhibit a positive force-to-distance characteristic during movement of the pressure plate through the first portion of the predetermined distance. Such at least one second diaphragm spring can be installed to generate forces which promote the disengagement of the clutch during movement of the pressure plate through the entire first portion of the predetermined distance. It is further possible to select and install the at least one second diaphragm spring in such a way that it is operative to generate forces tending to promote the disengagement of the clutch during a part of movement of the pressure plate through the second portion of the predetermined distance.

The at least one second diaphragm spring can bear, directly or indirectly, against the housing or against the bias reducing means and then reacts (directly or indirectly) against the bias reducing means or against the housing. For example, the at least one second diaphragm spring can bear (directly or indirectly) against the housing or against the at least one first diaphragm spring and then reacts (directly or indirectly) against the at least one first diaphragm spring or against the housing.

The at least one second diaphragm spring can be installed in such a way that it is stressed in the engaged condition of the clutch but does not exert any force (or does not exert any appreciable force) in the direction of the common axis of the pressure plate and the counterpressure plate. Alternatively, when stressed in the engaged condition of the clutch, the at least one second diaphragm spring can exert a relatively small force in the the direction of the common axis.

The at least one second diaphragm spring can have a substantially sinusoidal force-to-distance characteristic curve and is or can be installed in such a way that it is subjected to a minimum stress (or to a stress at least very close to the minimum stress) in the engaged condition of the clutch.

As already mentioned above, the at least one second diaphragm spring can be stressed in the engaged condition of the clutch to generate a force in the direction of the common axis of the pressure plate and the counterpressure plate.

The clutch disc can further comprise the aforementioned resilient means, e.g., one or more leaf springs or other suitable springs which are disposed between the friction linings and urge the friction linings for the pressure plate and the counterpressure plate away from each other in the direction of the common axis of the pressure plate and the counterpressure plate.

The friction clutch can further comprise means for tiltably mounting the at least one second diaphragm spring on the housing. The arrangement can be such that a radially outer portion of the at least one second diaphragm spring is tiltably mounted on (i.e., articulately connected with) the housing. A radially inner portion of the at least one second diaphragm spring can act upon the bias reducing means.

A further feature of the invention resides in the provision of an engageable and disengageable friction clutch which can be utilized with advantage in motor vehicles to transmit or to interrupt the transmission of torque between a prime mover (such as a combustion engine) and a transmission or another torque receiving device. The friction clutch comprises a housing which is rotatable about a predetermined axis, means for rotating the housing including a counterpressure plate (such as a flywheel) which is rotatable about the predetermined axis and can be fixedly secured to the housing, and a pressure plate which is coaxial and rotatable with and is disposed between the housing and the counterpressure plate for limited movement in the direction of the common axis of the housing and the counterpressure plate. The friction clutch also comprises a clutch disc which is coaxial with and is disposed between the pressure plate and the counterpressure plate and has friction linings which are subject to wear upon repeated progressive frictional contact and repeated progressing reduction of frictional contact with the pressure plate and the counterpressure plate in response to axial movement of the pressure plate toward and away from the counterpressure plate, means for moving the pressure plate including at least one first energy storing element arranged to bias the pressure plate against the clutch disc in the engaged condition of the clutch, means for reducing the bias of the at least one first energy storing element upon the pressure plate to thus disengage the clutch, at least one second energy storing element which operates in parallel with the at least one first energy storing element to generate forces which promote the disengagement of the clutch, resilient means disposed between the friction linings of the clutch disc and also serving to generate forces which promote the disengagement of the clutch, and means for preferably automatically compensating for wear at least upon the friction linings. If desired, such compensating means can be designed to change the positions of the pressure plate and the at least one first energy storing element relative to each other to an extent which is necessary to compensate for wear upon the friction linings and also for wear upon the pressure plate, the counterpressure plate, the at least one first energy storing element and/or the housing during the useful life of the friction clutch.

The at least one second energy storing element can be constructed and installed to exhibit a progressive force-to-distance characteristic at least during at least one portion or stage of movement of the pressure plate in a direction to disengage the clutch.

The at least one first energy storing element and/or the at least one second energy storing element can include or constitute a diaphragm spring.

The at least one first energy storing element can include or constitute a spring (e.g., a diaphragm spring) having an annular portion (which can bias the pressure plate in the engaged condition of the clutch) and prongs or analogous or similar projections or protuberances extending from the annular portion substantially or exactly toward the common axis of the pressure plate and the counterpressure plate and forming part of the means for reducing the bias of the at least one first energy storing element upon the pressure plate.

The at least one first energy storing element can be constructed and installed to exhibit a degressive force-to-distance characteristic at least during at least one portion or stage of movement of the pressure plate in a direction away from the counterpressure plate.

The pressure plate covers a predetermined distance during axial movement away from the counterpressure plate in order to disengage the clutch. The friction clutch is preferably designed and assembled in such a way that the pressure plate applies to the clutch disc a decreasing force during movement through a first or initial portion of the predetermined distance, and the clutch disc is or can be spaced apart from the pressure plate and/or from the counterpressure plate during movement of the pressure plate through a second or next-following portion of the predetermined distance. The at least one second energy storing element can exhibit a positive force-to-distance characteristic during movement of the pressure plate through the first or initial portion of the predetermined distance. The arrangement can be such that the at least one second energy storing element generates forces which promote the disengagement of the clutch during movement of the pressure plate through the entire first or initial portion of the predetermined distance. Furthermore, the clutch can be constructed and assembled in such a way that the at least one second energy storing element is operative to generate forces which tend to promote the disengagement of the clutch at least during a part of movement of the pressure plate through the second or next-following portion of the predetermined distance.

The at least one second energy storing element can bear (directly or indirectly) against the housing or against the bias reducing means and then reacts (either directly or indirectly) against the bias reducing means or against the housing. For example, the at least one second energy storing element can bear (directly or indirectly) against the housing or against the at least one first energy storing element and then reacts against the at least one first energy storing element or against the housing.

The at least one second energy storing element can be stressed, in the engaged condition of the clutch, in such a way that it does not exert any (or does not exert any appreciable or noticeable) force in the direction of the common axis of the pressure plate and the counterpressure plate. Alternatively, the at least one second energy storing element can be stressed (in the engaged condition of the clutch) in such a way that it exerts a relatively small force in the direction of the common axis of the pressure plate and the counterpressure plate.

It is often preferred to select an at least one second energy storing element having a substantially sinusoidal force-to-distance characteristic curve and being subjected to a minimal stress (or to a stress at least very close to the minimal stress) in the engaged condition of the friction clutch.

As already mentioned above, the at least one second energy storing element can be stressed when the friction clutch is engaged, and such stressed element can be installed and designed not to generate any appreciable forces in the direction of the common axis of the pressure plate and the counterpressure plate or to generate a relatively small force in the direction of such axis. However, it is also within the purview of the invention to employ one or more second energy storing elements capable of generating pronounced or relatively large forces in the direction of the common axis of the pressure plate and the counterpressure plate when the clutch is engaged.

The aforementioned resilient means of the clutch disc can include at least one spring (e.g., a leaf spring) which biases the friction linings away from each other in the direction of the common axis of the pressure plate and the counterpressure plate. Such spring or springs ensure smooth or gradual engagement as well as smooth or gradual disengagement of the friction clutch because they can gradually yield during engagement of the clutch (when the pressure plate is caused to move toward the counterpressure plate) and because they can gradually dissipate energy during movement of the pressure plate away from the counterpressure plate.

If the at least one second energy storing element includes or constitutes a diaphragm spring, the friction clutch can further comprise means for tiltably mounting the diaphragm spring on the housing. The tiltable mounting can involve the establishment of an articulate connection between a radially outer portion of the diaphragm spring of the at least one second energy storing element and the housing. A radially inner portion of a diaphragm spring forming part of or constituting the at least one second energy storing element can be mounted to act upon the bias reducing means of the friction clutch.

The novel features which are considered as characteristic of the invention are set forth in particular in the appended claims. The improved friction clutch itself, however, both as to its construction and the mode of assembling and using the same, together with additional features and advantages thereof, will be best understood upon perusal of the following detailed description of certain presently preferred specific embodiments with reference to the accompanying drawings.

BRIEF DESCRIPTION OF THE DRAWINGS

FIG. 1 is a fragmentary axial sectional view of a friction clutch which embodies one form of the invention;

FIG. 2 is a fragmentary sectional view substantially as seen in the direction of arrows from the line II—II in FIG. 1;

FIG. 3 is a diagram showing the relationship of forces generated and applied by various constituents of the friction clutch of FIGS. 1 and 2;

FIG. 4 is another diagram;

DESCRIPTION OF PREFERRED EMBODIMENTS

Figure 9:
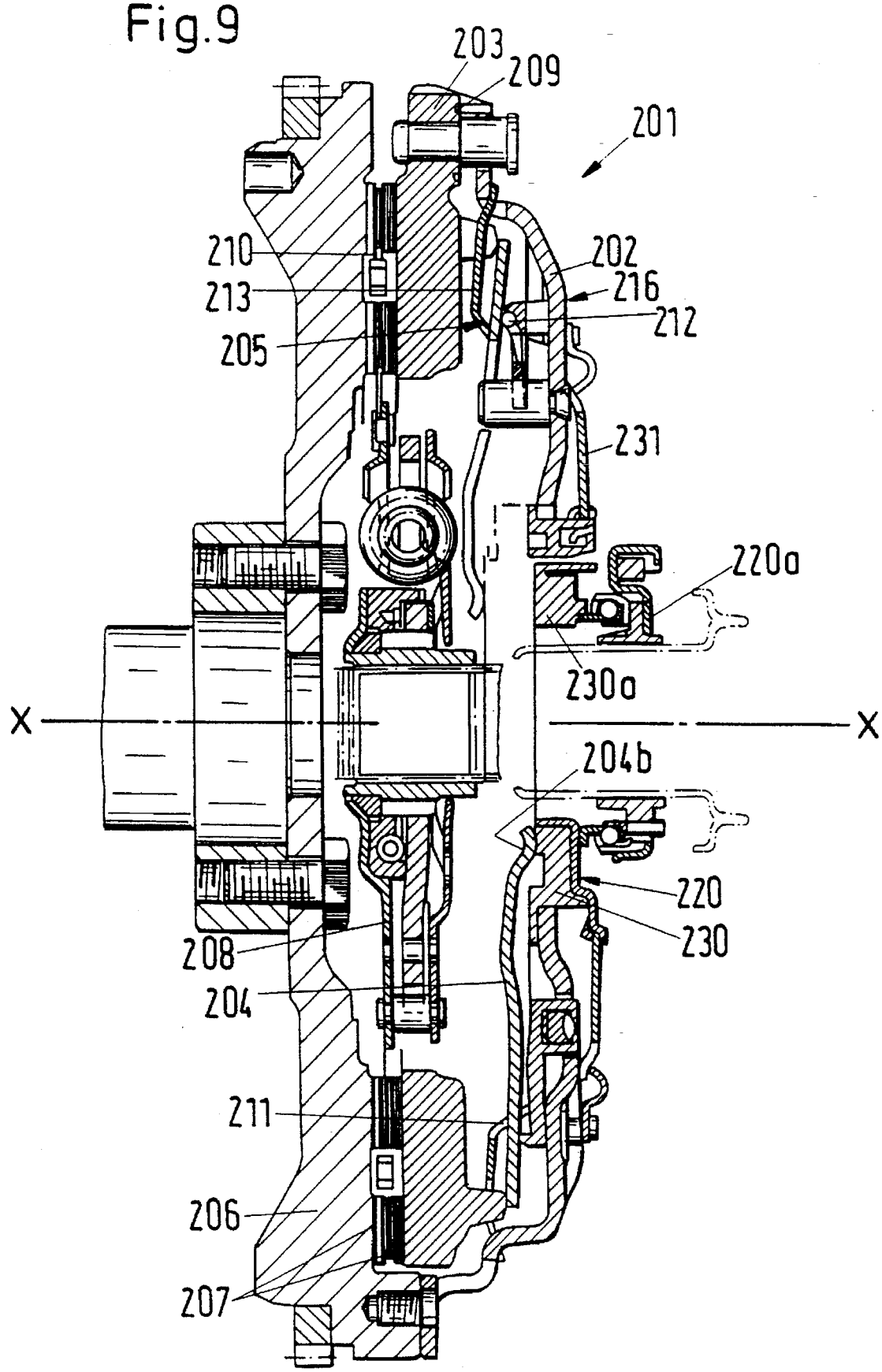
FIG. 9 is an axial sectional view of still another friction clutch which embodies the invention.

FIGS. 1 and 2 illustrate certain details of a so-called pull type friction clutch 1 which comprises a housing or cover 2 rotatable about an axis corresponding to the axis X—X shown in FIG. 9, and serving to transmit torque to a pressure plate 3. The means for transmitting torque from the housing 2 to the pressure plate 3 can comprise suitable leaf springs (shown in FIG. 9, as at 209) which enable the pressure plate to perform limited movements in the direction of the common axis of the parts 2, 3 but compel the pressure plate to share all angular movements of the housing.

When the clutch 1 is engaged, a clutch spring 4 (here shown as a diaphragm spring) biases the pressure plate 3 against the adjacent friction lining or linings 7 of a clutch disc 8 which is interposed between the pressure plate and a counterpressure plate 6. The housing 2 carries a ring-shaped seat assembly 5 which tiltably supports the circumferentially complete annular radially outer or main portion 4a of the clutch spring 4. The counterpressure plate 6 is coaxial with and is rigidly connected to the marginal portion of the housing 2 and serves as a means for rotating the housing 2 and hence also the pressure plate 3, the clutch disc 8 (when the clutch 1 is engaged) and the clutch spring 4. The counterpressure plate 6 can constitute a flywheel (or can form part of a composite flywheel) which is affixed to a rotary output element (such as a camshaft or a crankshaft) of a prime mover, e.g., a combustion engine in a motor vehicle. The hub (not shown in FIGS. 1 and 2) of the clutch disc or clutch plate 8 can transmit torque to the input shaft of a transmission in the power train between the engine and the wheels of the vehicle. Reference may be had, for example, to commonly owned U.S. Pat. No. 5,180,335 granted Jan. 19, 1993 to Paul Maucher for "Torsion damping assembly for use with clutches in motor vehicles". The disclosure of this patent is incorporated herein by reference.

The clutch disc 8 comprises two friction linings or two sets of friction linings 7 and one or more energy storing resilient segments 10 between the friction linings. When the clutch 1 is in use, the friction linings 7 undergo wear as a result of repeated progressing frictional contact with the plates 3, 6 during engagement of the clutch as well as due to repeated progressing reduction of frictional contact with the adjacent plates during disengagement of the clutch. The resilient segments 10 serve as a means for ensuring gradual engagement of the clutch 1 in response to axial movement of the pressure plate 3 toward the counterpressure plate 6 (the segments then yield to permit gradual movement of the two friction linings 7 toward each other), and the segments 10 also ensure gradual or smooth disengagement of the clutch because they move the friction linings 7 apart during the initial stage of disegagement, i.e., when the pressure plate 3 begins to move axially and away from the counterpressure plate 6. Otherwise stated, the resilient segments ensure a gradual rise of axial forces acting upon the linings 7 in the course of engagement of the clutch 1 (namely during movement of the pressure plate 3 toward the counterpressure plate 6) and a gradual reduction of such axial forces at least during the initial stage of disengagement of the clutch (namely when the pressure plate 3 begins to move axially and away from the counterpressure plate 6). The clutch disc or clutch plate 8 is preferably constructed and assembled in such a way that the friction linings 7 have limited freedom of axial movement away from each other under the bias of the resilient segments 10.

The illustrated clutch spring (diaphragm spring) 4 includes a set of resilient prongs 4b or analogous projections or protuberances which extend from the radially outer portion 4a toward the common axis of the parts 2, 3, 4, 5, 6 and 8, i.e., radially inwardly from the portion 4a. When the clutch 1 is engaged, the radially outer portion 4a of the clutch spring 4 urges the pressure plate 3 against the adjacent friction lining 7 and the prongs 4b are unstressed or are not stressed sufficiently to compel the spring 4 to pivot at 5 relative to the housing 2 to an extent which is needed to effect a disengagement of the clutch 1 by enabling the aforementioned leaf springs to move the pressure plate 3 axially and away from the counterpressure plate 6.

The seat assembly 5 of the friction clutch 1 which is shown in FIGS. 1 and 2 is located radially outwardly of the location where the spring portion 4a acts upon the pressure plate 3 when the clutch is engaged. This assembly includes an annular seat 11 (e.g., a wire ring) which is interposed between the bottom wall of the housing 2 and the radially outermost part of the circumferentially complete portion 4a of the clutch spring 4. The seat 11 is centered in the adjacent portion of the substantially radially extending bottom wall of the housing 2 so that its axis coincides with the common axis of the housing 2, pressure plate 3 and the aforementioned several other parts of the friction clutch 1. The housing 2 and/or the clutch spring 4 further comprises means for preventing rotation of these parts relative to each other, i.e., the clutch spring shares all angular movements of the plates 3 and 6.

The friction clutch 1 further comprises means (denoted by the character 12) for automatically compensating for wear at least upon the friction linings 7 of the clutch plate or disc 8. It is preferred to design the compensating means 12 in such a way that, in addition to the wear upon the friction linings 7, it can also compensate for wear upon one or more additional constituents of the friction clutch 1, such as the pressure plate 3, the counterpressure plate 6, the clutch spring 4 and/or the housing 2.

The illustrated wear compensating means 12 comprises a wear compensating unit proper (shown at 13) which is interposed between the clutch spring 4 and the pressure plate 3, and a sensor 14 which serves as a means for monitoring or detecting the extent of wear at least upon the friction linings 7. The sensor 14 and the wear compensating unit 13 are disposed at the same radial distance (or at least close to the same radial distance) from the common axis of the housing 2 and pressure plate 3. Furthermore, the sensor 14 overlies the wear compensating unit 13, as seen in the axial direction of the friction clutch 1 from the housing 2 toward the pressure plate 3.

The sensor 14 is a composite monitoring device including an annular array of preferably equidistant discrete sensor elements 15. Each sensor element 15 comprises a sleeve-like member 16 which is movable in parallelism with the axis of the housing 2 along one of several axially parallel protuberances or studs 17 anchored in the pressure plate 3 and extending through and beyond the bottom wall of the housing 2. The illustrated stud 17 is a separately produced part which is anchored in the pressure plate 3; however, it is equally possible to make the studs 17 of one piece with the pressure plate.

The internal surface of each sleeve-like member 16 is in frictional engagement with the peripheral surface of the respective stud 17. For example, each member 16 can be provided with axially parallel slits which alternate with axially parallel tongues or prongs tending to pivot radially inwardly toward frictional engagement with the peripheral surface of the corresponding stud 17. Thus, the inner diameter of that part of a sleeve-like member 16 which is provided with the aforementioned tongues or prongs is less than the diameter of a stud 17 when the member 16 is slipped off such stud.

The axially outer end portion of each sleeve-like member 16 includes a radially outwardly extending collar 19 constituting a stop which can move into abutment with the external surface of the bottom wall of the housing 2. The collar 19 can move into actual contact with the housing 2 at least after the friction linings 7 have already undergone a certain amount of wear as a result of repeated progressing frictional contact and repeated reduction of frictional contact with the adjacent plates 3 and 6. The radially outer portion 4a of the clutch spring 4 is provided with openings for the studs 17 and the sleeve-like members 16 of the respective sensor elements 15.

When the clutch 1 is engaged after the friction linings 7 have already undergone a certain amount of wear, the collars 19 move into engagement with the housing 2 in response to engagement of the clutch 1, and this ensures that the axial position of the pressure plate 3 relative to the sleeve-like members 16 is changed through a distance corresponding to the extent of wear upon the friction linings.

The wear compensating unit 13 of the wear compensating means 12 comprises a ring-shaped compensating element 20 which can be made of metallic sheet material and has a substantially U-shaped cross-sectional outline. When the clutch 1 is engaged, the ring-shaped element 20 is acted upon by the clutch spring 4 so that it causes the pressure plate 3 to bear against the adjacent friction lining 7 of the clutch disc 8. In other words, the ring-shaped element 20 serves as a means for transmitting axially oriented forces from the clutch spring 4 to the pressure plate 3.

The wear compensating unit 13 further comprises an adjusting device 21 which is installed between the ring-shaped element 20 and the pressure plate 3 and renders it possible to achieve an automatic shifting (adjustement) of the ring-shaped element 20, in response to disengagement of the clutch 1, when necessary to compensate for initial or additional wear upon the friction linings 7. On the other hand, the adjusting device 21 is self-locking when the clutch 1 is engaged, i.e., the ring-shaped element 20 can change its axial position relative to the pressure plate 3 only when the clutch is disengaged. This is desirable and advantageous because the axial position of the ring-shaped element 20 relative to the pressure plate 3 is fixed during axial movement of the pressure plate 3 toward the counterpressure plate 6, i.e., in a direction to clamp the friction linings 7 between the adjacent friction faces of the respective plates 3 and 6. The ability of the wear compensating unit 13 to prevent any attempts at compensation for wear during movement of the pressure plate 3 in a direction to engage the clutch 1 and/or during actual engagement of the clutch constitutes a desirable safety feature which contributes to more predictable and more accurate compensation for wear upon the friction linings 7 and, if desired or necessary, upon one or more additional parts which are subject to wear or are likely to be subjected to wear in actual use of the friction clutch.

The adjusting device 21 which is shown in FIGS. 1 and 2 comprises an array of pairs of circumferentially extending ramps 22, 23. The ramps of each pair have abutting surfaces which slope axially as well as circumferentially of the pressure plate 3. The ramps 22 are shown as integral parts of (actually of one piece with) the ring-shaped 5 element 20, and the ramps 23 are integral (and can be of one piece) with the pressure plate. The ring-shaped element 20 has a relatively short cylindrical radially outer portion 24 whose axis coincides with the axis of the pressure plate 3 and which is provided with suitable triangular cutouts to thus form the ramps 22. The ramps 23 can constitute suitably configurated projections at that side of the pressure plate 3 which confronts the inner side of the bottom wall of the housing 2.

The ramps 22 of the adjusting device 21 which is shown in FIGS. 1 and 2 directly abut the adjacent ramps 23, and the abutting sloping surfaces of the pairs of cooperating ramps are biased against each other. This is achieved by the provision of energy storing elements 25 here shown as coil springs which act in the circumferential direction of the pressure plate 3. Each coil spring 25 reacts against the pressure plate 3 or against the ring-shaped element 20 and bears against the element 20 or against the presure plate.

The ring-shaped element 20 can turn relative to the pressure plate 3, and this involves a sliding movement of the ramps 22 along the adjacent ramps 23. Such turning of the element 20 relative to the pressure plate 3 is made possible by the provision of suitable windows or slots 26 formed in the element 20 and dimensioned to receive the studs 17 of the pressure plate 3 with requisite clearance which is required to permit sufficient angular displacements of the element 20 relative to the pressure plate to compensate for wear upon the friction linings 7 during the entire useful life of the clutch disc 8 (preferably during the entire useful life of the friction clutch 1).

The angle 27 (shown in FIG. 2) of slope of the abutting surfaces of the ramps 22, 23 (relative to a plane which is normal to the axis of the pressure plate 3) is selected in such a way that, when the ramps 22 are urged against the adjacent ramps 23, the frictional engagement between the abutting surfaces of such pairs of ramps suffices to prevent any or any appreciable angular displacements of the ring-shaped element 20 relative to the pressure plate 3. The exact magnitude of the angle 27 will depend upon a plurality of factors, e.g., the material of the ramps 22, 23, the finish of the abutting surfaces of the pairs of ramps and the bias of the clutch spring 4. It is presently preferred to select an angle 27 within the range of between about 4° and 15°, most preferably between about 4° and about 8°.

The direction in which the ring-shaped element 20 must turn relative to the presure plate 3 in order to compensate for wear upon the friction linings 7 is indicated in FIG. 2 by an arrow 28. It will be noted that the apices of the angles 27 of slope of the ramps 22 forming part of the ring-shaped element 20 face in the direction of the arrow 28.

The bias of the coil springs 25 (i.e., the force with which the ramps 22 bear against the adjacent ramps 23) and the magnitude of the angle 27 of slope of the abutting surfaces of the ramps 22, 23 are selected in such a way that the resultant axial force acting upon the ring-shaped element 20 is much smaller than the force which is required to move the sleeve-like elements 16 of the sensors 15 in the axial direction of the respective studs 17.

If the friction clutch 1 is not provided with any axially fixed stop or stops which would limit the extent of axial movability of the pressure plate 3 relative to an axially fixed part (such as the housing 2 or the counterpressure plate 6), the aforementioned resultant axial force acting upon the ring-shaped element 20 is selected (with reference to the axial force exerted by the leaf springs (corresponding to the leaf springs 209 shown in FIG. 9) which bias the pressure plate 3 axially and away from the counterpressure plate 6) in such a way that the wear compensating unit 13 is capable of performing its intended function. It is presently considered advisable to select the stress of the leaf springs (209) in such a way that the axial force exerted thereby upon the pressure plate 3 in the disengaged condition of the clutch 1 is nil or close to nil. At any rate, the axial force then exerted by the leaf springs is less than the axial force acting upon the ring-shaped element 20.

It is often preferred to provide one or more abutments or stops (one shown in FIG. 1, as at 29) which limit the extent of axial movability of the pressure plate 3 in a direction away from the counterpressure plate 6, i.e., toward the bottom wall of the housing 2. Such stop or stops 29 ensure that the extent of axial movement of the pressure plate 3 for the purpose of effecting disengagement of the clutch 1 is always the same. The illustrated stop 29 changes its axial position as a function of the extent of progressing wear upon the friction linings 7.

The construction of the wear compensating means 12 can be simplified if it embodies or includes the stop or stops 29. The stop 29 which is shown in FIG. 1 is an integral part of the sleeve-like member 16 of the respective sensor element 15. This stop strikes against and is arrested by the inner side of the bottom wall of the housing 3 when the pressure plate 3 completes a movement through a predetermined distance axially and away from the counterpressure plate 6. For example, the distance 30 to be covered by the pressure plate 3 during disengagement of the clutch 1 can be in the range of between about 1.5 mm and 3 mm. The illustrated stop 29 of the sleeve-like member 16 then strikes the surface surrounding the inner end of the opening provided in the bottom wall of the housing 2 for the respective stud 17 and member 16. The aforementioned distance range of between about 1.5 mm and about 3 mm can be exceeded or shortened in dependency on the exact nature of the friction clutch and its wear compensating means. Furthermore, the stop or stops 29 need not form part of the wear compensating means 12, i.e., such stop or stops can constitute separately produced and mounted parts. Attention is invited, for example, to U.S. Pat. No. 4,207,972 the disclosure of which is incorporated herein by reference.

In selecting the characteristics oft he clutch spring 4, it is necessary to take into consideration that this spring must overcome the bias of the leaf springs (209) during engagement of the clutch 1 as well as that the spring 4 should be capable of shifting the sleeve-like member 16 along the respective studs 17. As concerns the exact nature of leaf springs which can be utilized in the friction clutch 1 of FIGS. 1 and 2 to bias the pressure plate 3 axially and away from the counterpressure plate, the inventor invites attention to U.S. Pat. No. 4,615,424 the disclosure of which is incorporated herein by reference.

The leaf springs (209) not only bias the pressure plate 3 axially and away from the counterpressure plate 6 but they also serve to transmit torque from the housing 2 to the pressure plate. Their stressing in the engaged condition of the clutch 1 is or should be sufficient to ensure that the pressure plate 3 is actually moved axially and away from the counterpressure plate 6 during disengagement of the clutch which takes place as a result of a reduction of the bias of the clutch spring 4 upon the pressure plate. Such selection of the bias of the leaf springs upon the pressure plate 3 ensures that the ring-shaped element 20 continues to contact the clutch spring 4 during the entire clutch disengaging operation. If the clutch is provided with one or more stops 29, the element 20 continues to bear against the clutch spring 4 until the stop or stops 29 reach the inner side of the bottom wall of the housing 2.

FIG. 1 shows that the illustrated wear compensating means 12 is designed, assembled and mounted in such a way that the regions of contact between the ramps 22 and the neighboring ramps 23, the annular region of contact between the ring-shaped element 20 and the clutch spring 4, and the annulus of regions of contact between the ring-shaped element 20 and the sleeve-like member 16 are disposed at the same (or at least close to the same) radial distance from the common axis of the housing 2 and pressure plate. In other words, the aforementioned regions overlie each other as seen in the axial direction of the housing 2 and pressure plate 3. In the wear compensating means 12 of FIGS. 1 and 2, the collars 19 and the stops 29 are also disposed at or close to the same radial distance 38 from the axis of the housing 2 as the ring 20 and the ramps 22, 23.

If the clutch 1 is provided with one or more stops 29 to limit the extent of axial movability of the pressure plate 3 away from the counterpressure plate 6, the path for disengagement in the region of the radially inner end portions or tips 4c of the prongs 4b forming part of the clutch spring 4 is or can be selected in such a way that, when the clutch is disengaged, the clutch spring 4 is slightly spaced apart from the ring-shaped element 20 in the axial direction of the housing 2. Thus, the axial distance covered by the clutch spring 4 at the radial distance 38 of the ring-shaped element 20 from the axis of the housing 2 exceeds the maximum distance which can be covered by the pressure plate 3 away from the counterpressure plate 6 due to the provision of the stop(s) 29.

In accordance with a feature of the invention, the clutch 1 further comprises an energy storing element 31 which operates in parallel with the clutch spring 4 and serves to generate forces which promote, at least in part, the disengagement of the clutch. The illustrated energy storing element 31 is a diaphragm spring which has a circumferentially complete annular radially outer portion 32 tiltably coupled to the housing 2 and radially inwardly extending tongues, prongs or like protuberances 33 which are coupled to the prongs 4b of the clutch spring 4. As can be seen in FIG. 1, the energy storing element 31 is installed at the outer side of the bottom wall of the housing 2. The means for coupling the tongues 33 of the energy storing element 31 to the prongs 4b of the clutch spring 4 includes rivets 35. The heads 36 of the rivets 35 serve as abutments or stops which limit the extent of movability of the tips of the tongues 33 axially of the housing 2 and away from the adjacent prongs 4b.

The energy storing element 31 is preferably mounted on the housing 2 in an at least slightly axially stressed condition, most preferably in such a way that the axial stress upon the element 31 is at or close to a predetermined minimum value. Such minimum value develops when the element 31 is a diaphragm spring having an at least substantially sinusoidal force-to-distance characteristic.

When the clutch 1 is engaged, the axial force which the energy storing element 31 applies to the clutch spring 4 is preferably zero or close to zero. However, it is often preferred and desirable to mount the element 31 in such a way that it exerts upon the clutch spring 4 a relatively small force in a direction (arrow 37 in FIG. 1) to disengage the clutch when the clutch is fully engaged. The element 31 can be said to constitute a servo whose bias to urge the tips 4c of the prongs 4b in the direction of arrow 37 increases during disengagement of the clutch. The prongs 4b constitute means for reducing the bias of the clutch spring 4 upon the pressure plate 3 (so that the latter can move away from the counterpressure plate 6 under the action of the leaf springs (209) and the resilient segments 10) during disengagement of the clutch.

The bias of the energy storing element 31 upon the clutch spring 4 increases during the initial stage or portion of actual disengagement of the clutch 1 to thereupon decrease as the disengagement of the clutch progresses. Otherwise stated, the element 31 initially exerts upon the spring 4 an increasing force in the direction of the arrow 37, and the force which the element 31 exerts in such direction thereupon decreases. That stage when the element 31 exerts a maximum force in the direction of the arrow 37 (i.e., when such force begins to decrease as the disengagement of the clutch progresses) is reached when the curve denoting the progress of the disengaging forces reaches or is at least close to a lowermost point. The stressing of the element 31 can decrease to zero prior to completion of the disengaging operation. As the disengagement continues (i.e., as the tips 4c of the prongs 4b continue to move in the direction of the arrow 37), only the conicity of the clutch spring 4 (which, in the embodiment of FIGS. 1 and 2, is a diaphragm spring) is caused to change because the spring 4 is caused to pivot at the locus defined by the seat assembly 5. This means that, as the disengagement of the clutch 1 progresses subsequent to unstressing of the energy storing element 31, the progress of the disengaging force up to completion of the disengaging operation is determined (either primarily or exclusively) by the clutch spring 4.

The diagrams which are shown in FIGS. 3 and 4 are intended to facilitate the understanding of the relationships of various forces which develop in actual use of a friction clutch of the type shown in FIGS. 1 and 2 in the power train between the combustion engine and the transmission of a motor vehicle, e.g., a truck.

The sinusoidal curve 40 in the diagram of FIG. 3 denotes the progress of axial forces while the conicity of the clutch spring 4 changes and by taking into consideration certain other influences such as the bias of leaf springs (209) acting upon the pressure plate 3 in a direction to move it away from the counterpressure plate 6. It is assumed that the clutch spring 4 has undergone a deformation starting from a fully unstressed position between two radially spaced apart locations, namely the radially outer location determined by the position of the seat assembly 5 and the radially inner location (at 38) determined by the diameter of that portion of the ring-shaped element 20 which is in contact with the adjacent side of the spring 4, namely at the radius 38 from the axis of the housing 2. The distance covered by the clutch spring 4 between the two (radially inner and radially outer) locations (in millimeters) is measured along the abscissa and the magnitude of the resultant force generated by the spring 4 and the leaf springs (209) is measured along the ordinate. The point 41 on the curve 40 denotes the magnitude of the resultant force when the clutch 1 is engaged, i.e., when the clutch spring 4 is called upon to apply to the pressure plate 3 a maximum force in a direction to maintain the clutch in fully engaged condition. The point 41 can be shifted along the curve 40 in a direction toward or away from the ordinate of the diagram of FIG. 3 by changing the conicity of the clutch spring 4 in the engaged condition of the clutch.

The broken-line curve 42 in the diagram of FIG. 3 denotes the axially oriented spreading force which is generated by the resilient segments 10 between the friction linings 7 of the clutch disc 8. The curve 42 can further denote certain other axially oriented forces which act in the same direction as the forces generated by the resilient segments 10; such other axially oriented forces can be caused, for example, by the resiliency of the cover or housing 2, the resiliency or elasticity (if any) of the seat assembly 5 and/or the elasticity of resilient inserts (if any) between the clutch spring 4 and the pressure plate 3. The force denoted by the curve 42 opposes the force (curve 40) which is generated by the clutch spring 4 and is being applied to the pressure plate 3.

It has been found that the operation of the clutch 1 is particularly satisfactory if the magnitude of the axial force necessary to effect a maximum possible elastic deformation of the resilient segments 10 between the friction linings 7 of the clutch disc 8 at least matches the axial force which the clutch spring 4 applies to the pressure plate 3 in the fully engaged condition of the clutch. The resilient segments 10 dissipate energy during disengagement of the clutch, namely while the pressure plate covers a first portion 43 of the maximum possible distance 50 in a direction axially of and away from the counterpressure plate 6. As already mentioned before, the energy storing element 31 operates in parallel with the clutch spring 4 and the element 31 assists the bias of the resilient segments 10 during the first stage (distance 43 in FIG. 3) of disengagement of the clutch. In other words, the maximum disengaging force can be smaller than that denoted by the point 41 on the curve 40, and this is attributable to the provision of a clutch disc which employs resilient segments 10.

When the disengagement of the clutch progresses beyond the point 44 (i.e., when the pressure plate 3 continues to move away from the counterpressure plate 6 beyond the portion 43 of the maximum possible distance 50), the required disengaging force is much smaller than the Spring force denoted by the point 41 on the curve 40. This is attributable to the degressive characteristic of the curve 40 in the region of the point 44.

The broken-line curve 45 denotes in the diagram of FIG. 3 the progress of the disengaging force in the absence of the energy storing element 31. With reference to the radius 38 (i.e., the locus where the clutch spring 4 acts upon the pressure plate 3), the disengaging force denoted by the curve 45 at first increases to the point 44 to thereupon decrease at the same rate as the force of the clutch spring 4 (curve 40). Such drop of the disengaging force ends at the (lowermost) point 46 of the curve 40. The force being applied by the clutch spring 4 begins to increase beyond the point 46 toward the point 47 which is reached when the pressure plate 3 has completed its axial movement away from the counterpressure plate 6.

The curve 40 of FIG. 3, and particularly that part of the curve which extends between the points 44, 46 and 47, clearly indicates that, in the absence of the energy storing element 31, the magnitude of the disengaging force would fluctuate to a considerable extent at least upon disengagement (at 44) of the pressure plate 3 from the adjacent friction linings 7 of the clutch disc 8.

The curve 48 in the diagram of FIG. 4 indicates the progress of the disengaging force at the diameter 4d (FIG. 1) of the friction clutch 1, i.e., of a friction clutch which is equipped with the energy storing element 31. The diameter 4d is the diameter of the annulus formed by the tips 4c of the prongs 4b forming part of the clutch spring 4. The curve 48 corresponds to that portion of the curve 40 in FIG. 3 which includes the points 44, 46 and 47. The distance which can and should be covered by the tips 4c in the direction of the arrow 37 under the action of a disengaging bearing 39 or the like is shown in the diagram of FIG. 4, as at 49. This distance exceeds the distance 50 (FIG. 3) by a value corresponding to the lever arm of the clutch spring 4. Such lever arm corresponds to the ratio of the radial distance between the seat assembly 5 and half the diameter 4d to the radial distance between the seat assembly 5 and the radius 38 (i.e., the distance of the locus of contact between the clutch spring 4 and the ring-shaped element 20 from the axis of the pressure plate 3). In many or most instances, the just defined ratio is between 3:1 and 6:1 but can be more or less, depending on certain specific circumstances of use of the improved friction clutch. In the clutch of FIGS. 1 and 2, the ratio is at least close to 6:1.

The disengaging force which is indicated by the curve 48 of FIG. 4 (while the pressure plate 3 covers the maximum distance 49 during disengagement of the clutch 1) is smaller than the force denoted by the curve 40 of FIG. 3 (at the diameter 4d of the tips 4c of the prongs 4b) by the aforementioned ratio. As already explained before, the curve 45 of FIG. 3 denotes the progress of the disengaging force at the radius 38 when the clutch does not employ the element 31 or an equivalent of this element, such disengaging force being applied while the pressure plate 3 covers the first portion 43 of the overall distance 50 which is being covered during disengagement of the clutch. The portion 43 is covered by the pressure plate 3 while it still contacts the adjacent friction lining 7. The disengaging force denoted by the curve 45 in the diagram of FIG. 3 is the differential between the corresponding portion (between the points 41 and 44) of the disengaging force denoted by the curve 40 and the axial spreading force of the resilient segments 10 as denoted by the curve 42.

The point 44 on the curve 40 of FIG. 3 is reached when the pressure plate 3 completes its movement through the first portion 43 of the overall distance 50, i.e., when the pressure plate becomes disengaged from the adjacent friction linings 7. At such time, the clutch disc 8 is also disengaged from the counterpressure plate 6. Otherwise stated, the point 44 on the curve 40 of FIG. 3 denotes that stage of disengagement of the clutch 1 when the extent of frictional contact between the friction linings 7 and the plates 3, 6 is zero or at least very close to zero. At such time, the magnitude of the torque being transmitted from the plates 3, 6 to the clutch disc 8 is zero or practically nil. The resilient segments 10 have dissipated their energy.

As the pressure plate 3 continues to move away from the counterpressure plate 6 to cover the second portion 51 of the overall distance 50, there develops a progressively increasing clearance or gap between the pressure plate and the clutch disc 8.

The provision of the wear compensating means 12 and of the resilient segments 10 alone suffices to establish a much more satisfactory progress of the disengaging force than in conventional clutches which do not use equivalents of the segments 10 and/or wear compensating means 12. However, and as clearly shown by the curve 48 in the diagram of FIG. 4, the magnitude of the disengaging force will still fluctuate within a rather wide range even if the friction clutch employs the resilient segments 10 or their equivalents and even if the clutch is equipped with wear compensating means. Thus, and as indicated by that portion of the curve 48 which denotes the variations of the disengaging force while the tips 4c of the prongs 4b cover the maximum distance 49 during disengagement of a clutch employing the resilient segments 10 and the wear compensating means 12 but not the energy storing element 31 of its equivalent, the difference between the maximum disengaging force (at the point 52 of the curve 48) and the minimum disengaging force (at the point 53) is still relatively large. The factor denoting the ratio of disengaging forces at 52 and 53 is approximately 1.7. In fact, such factor will or can exceed (and considerably exceed) 1.7 in many types of friction clutches.

The curve 48 of FIG. 4 indicates that the disengaging force begins to rise in response to start of the disengaging operation and reaches the point 52 to thereupon decrease to the minimum value at 53. The rather pronounced difference between the disengaging forces denoted by the points 52 and 53 of the curve 48 is or can be undesirable under many circumstances of the use of the friction clutch. For example, such rather pronounced difference between the disengaging forces at 52 and 53 can interfere with accurate selection of the distance to be covered by the pressure plate during engagement or disengagement of the clutch. This holds true regardless of whether the clutch is being disengaged by a foot pedal or by a servomotor. For example, if the disengagement is to be effected by a servomotor (such as an electric motor), the latter must be designed to furnish the maximum disengaging force (as denoted by the point 53 on the curve 48 in the diagram of FIG. 4). This means that the vehicle must employ a relatively large and bulky servomotor which consumes large amounts of energy.

The aforediscussed drawbacks of friction clutches with or without resilient segments in their clutch discs and with or without wear compensating means are overcome by the provision of the energy storing element 31. The characteristic force-to-distance curve of the element 31 is shown in the diagram of FIG. 4, as at 54. In plotting the curve 54, the force which the element 31 applies to the heads 36 of the rivets 35 has been replaced by an equivalent force which would act upon the clutch spring 4 at the diameter 4d. Such shifting of the locus of application of the force being furnished by the energy storing element 31 has been carried out by taking into consideration the relevant lever arms.

FIG. 4 shows that the force furnished by the element 31 and acting upon the clutch disc 4 within the first portion 55 of the overall distance covered by the the tips 4c of the prongs 4b and the disengaging bearing 39 in the direction of arrow 37 (i.e., in a direction to disengage the clutch) increases gradually from a minimum value at 56 to a maximum value at 57 to thereupon again decrease to the minimum value (at 58). FIG. 4 further shows that the action of the force denoted by the curve 54 is counter to the action of the force denoted by the curve 48. At the point 56, the stressing of the energy storing element 31 is or can be zero or close to zero. It is often desirable and advantageous to design and install the element 31 in such a way that, at the point 56, this element still applies a residual force (a positive force) in a direction to disengage the clutch, i.e., in a direction as indicated by the arrow 37.

The element 31 assists in the disengagement of the clutch while the tips 4c and the bearing 39 cover the first portion 55 of the overall distance 49 covered by the bearing 39 during disengagement of the clutch. The force which is being furnished by the element 31 increases gradually and substantially between the points 56 and 57 of the curve 54 to thereupon decrease between the points 57 and 58. The energy storing element 31 whose force-to-distance characteristic is denoted by the curve 54 of FIG. 4 is no longer stressed at the point 58. At such time, the element 31 is supported exclusively by the housing 2 of the clutch 1.

It is possible to provide one or more stops which limit the extent of dissipation of energy by the element 31 during disengagement of the clutch in such a way that the element 31 remains under a residual stress, i.e., that the point 58 of the curve 54 is located at a level below the abscissa in the diagram of FIG. 4. Such stop or stops can be provided on or can form part of the housing 2. FIG. 1 shows schematically a stop 2a which is provided on or forms part of the bottom wall of the housing 2.

When the movement of the bearing 39 progresses beyond the portion 55 of the overall distance 49 which is to be covered during disengagement of the clutch 1, the element 31 remains in the fully unstressed condition (or remains under a residual stress as determined by the stop or stops 2a) while the clutch spring 4 is free to continue to pivot or be tilted relative to the housing 2. This is possible because the rivets 35 are designed to establish a predetermined play or clearance 36a between their heads 36 and the adjacent portions of the respective prongs 4b. In other words, the tongues 33 forming part of the energy storing element 31 and the tips 4c of the prongs 4b forming part of the clutch spring 4 have a limited freedom of movement relative to each other in the direction of the axis of the housing 2.

The curve 59 in the diagram of FIG. 4 indicates the resultant of disengaging forces denoted by the curves 48 and 54. Such actual or resultant disengaging force is being applied during the initial stage of movement of the bearing 39 in the direction of the arrow 37, i.e., in the direction to disengage the clutch. A curve corresponding to the curve 59 of FIG. 4 is shown in the diagram of FIG. 3 and is denoted by the character 60. The curve 60 was plotted by full consideration of the ratio of the lever arms at 38 and 4d.

FIG. 4 clearly shows that the provision of the energy storing element 31 renders it possible to greatly reduce the difference between the maximum and minimum disengaging forces and that the required maximum disengaging forces are much smaller than in a clutch which does not employ an equivalent of the element 31. It can be said that the element 31 renders it possible to achieve a linearization or flattening of the curve 59 denoting the actual progress of the disengaging force as well as to achieve a substantial reduction of such force. Thus, the maximum 52 of the curve 48 is moved a considerable distance toward the abscissa of the diagram of FIG. 4 with resultant pronounced savings in work and energy (as indicated by hatching between the curves 48 and 59 of FIG. 4). Consequently, if the means for disengaging the clutch includes a servomotor, the bulk, complexity and energy requirements of such servomotor are well below those of a servomotor which must be put to use if the energy storing element 31 or its equivalent(s) is or are omitted.

The relative positions of various constituents of the friction clutch 1 which is shown in FIGS. 1 and 2 correspond to those when the clutch is new or prior to development of appreciable wear upon the friction linings 7 and certain other parts (such as 2, 3, 4 and 6). When the friction linings 7 have undergone a certain amount of wear, the position of the pressure plate 3 is changed in a direction toward the counterpressure plate 6. This, in turn, entails a change of the conicity of the clutch spring 4 and hence a change of the bias of the clutch spring upon the pressure plate. The clutch spring 4 is preferably designed and mounted in such a way that its bias upon the pressure plate 3 increases in response to progressing wear upon the friction linings 7.

As the pressure plate 3 moves closer to the counterpressure plate 6, it changes its position relative to the sleeve-like members 16 of the sensor elements 15. Furthermore, the clutch spring 4 acts upon the ring-shaped element 20 which is thus caused to follow the axial movement of the pressure plate 3 in a direction away from the housing 2. Consequently, the ring-shaped element 20 moves axially and away from the sleeve-like members 16 through a distance which is proportional to the extent of wear at least upon the friction linings 7. The ring-shaped element 20 retains its axial position relative to the pressure plate 3 during engagement of the clutch 1 because it is biased by the clutch spring 4 which urges it toward the pressure plate. Moreover, and as already pointed out hereinbefore, the wear compensating unit 13 is self-locking, i.e., it constitutes a barrier or locking means in the course of a clutch engaging operation as well as during actual engagement of the clutch to prevent any compensation for wear during such stages of actual use of the clutch.

During disengagement of the clutch, i.e., when the pressure plate 3 is free to move axially and away from the counterpressure plate 6 under the bias of the leaf springs (209), the pressure plate approaches the housing 2 to the extent determined by the stop or stops 29. The axial position of the ring-shaped element 20 relative to the pressure plate 3 remains unchanged during axial movement of the pressure plate toward the stop or stops 29. As the disengagement of the clutch continues, the pressure plate 3 remains arrested by the stop or stops 29 but the ring-shaped element 20 is then free to turn to the extent determined by continued axial movement of the radially outer portion 4a of the clutch spring 4 at the radius 38. Such angular movement of the element 20 is terminated when the element 20 reaches the sleeve-like members 16 of the sensor elements 15. If the axial (actually pivotal) movement of the clutch spring 4 continues in a direction to move its portion 4a away from the pressure plate 3, the portion 4a also moves away from the ring-shaped member 20 because the latter is arrested by the sleeve-like members 16. Such (even very minor) axial disengagement of the clutch spring 4 from the ring-shaped element 20 is of particular advantage for proper operation of the wear compensating means 12.

The wear compensating means 12 ensures that no compensation for wear will take place if the tips 4c of the prongs 4b forming part of the clutch spring 4 move beyond their expected axial positions during engagement of the clutch and that no compensation can take place if the clutch spring 4 happens to perform vibratory movements in the axial direction of the housing 2.

Another advantage of the wear compensating means 12 is that it prevents any changes, or any appreciable changes, of the force-to-distance characteristics of the clutch spring 4 and the energy storing element 31 during the entire useful life of the clutch. Thus, the stressing of the clutch spring 4 and/or of the element 31 does not change in the engaged condition of the clutch irrespective of the (compensated) wear upon the friction linings 7. This, in turn, ensures that the bias upon the pressure plate 3 as well as the progress of the disengaging force remains at least substantially unchanged during the life span of the clutch.

The energy storing element 31 or its equivalent(s) can be utilized with equal or similar advantage in many other types of friction clutches which are equipped with wear compensating means, namely with means which can compensate for wear at least upon the friction linings of the clutch disc. By way of example only, friction clutches which are provided with wear compensating means are disclosed in published German patent applications Nos. 42 39 389, 42 39 291, 43 06 505 and 43 22 677 as well as in at least some of the references which are cited in such published applications. Also by way of example only, a manually adjustable wear compensating means for use in clutches is disclosed in U.S. Pat. No. 4,832,164.

It is also possible to utilize in the friction clutch of FIGS. 1 and 2 (or in an analogous clutch) an energy storing element 31 (or an equivalent of such element) which is installed in such a way that it exhibits a negative minimum of force when the clutch is engaged, i.e., that the element 31 or its equivalent biases the pressure plate 3 toward the counterpressure plate 6 when the clutch is engaged. More specifically, the element 31 then bears against the pressure plate 3 through the medium of the clutch spring 4.

In order to prevent the energy storing element (diaphragm spring) 31 from changing its orientation (namely from snapping over) relative to the clutch spring 4, the clutch of FIGS. 1 and 2 would have to be provided with suitable distancing means (not specifically shown) which would prevent a movement of the tips of the tongues 33 toward the adjacent portions of the prongs 4b of the clutch spring 4. Such distancing means would be installed in the clearances or gaps 36a one of which is shown in FIG. 1. Alternatively, it would be possible to install springs which would operate between the clutch spring 4 and the energy storing element 31; for example, such springs could be installed in the clearances 36a, i.e., in the regions where the tongues 33 abut the respective rivet heads 36, and would serve to bias the tongues 33 against the adjacent heads 36. However, the springs which would be used to bias the tongues 33 against the adjacent rivet heads 36 would have to be stressed when the energy storing element 31 would be caused to move beyond its unstressed position. This would entail an increase of the disengaging force as a result of additional tilting of the element 31 as well as due to the need to stress (compress) the springs between the tongues 33 and the adjacent rivet heads 36.

If a rise of the disengaging force during the last stage or portion of the movement of the bearing 39 in the direction of the arrow 37 (i.e., to disengage the friction clutch 1) is not desired, the clutch can be equipped with a so-called compensation spring which equalizes or levels the progress of the disengaging force. Compensation springs which can be utilized in the clutch of FIGS. 1 and 2 (or in analogous clutches) are disclosed, for example, in German patent application Serial No. P 43 17 586.4.

A clutch which is equipped with the wear compensating means 12 or analogous automatic wear compensating means must be further provided with means for maintaining the wear compensating means in its starting or retracted position not only during transport but also during installation of the clutch in the power train of a motor vehicle. Such maintaining means can or must be removed, dismantled or deactivated when the clutch is properly installed in the power train. For example, the maintaining means can be deactivated in automatic response to initial actuation of the clutch, e.g., in response to the action of centrifugal force when the counterpressure plate 6 receives torque from the prime mover for the very first time. Maintaining means of the above outlined character are disclosed in the above enumerated pending patent applications.

A presently preferred maintaining means can be designed to ensure that at least one constituent of the wear compensating means 12 (or analogous wear compensating means) which must be free to move in actual use of the wear compensating means is prevented from carrying out such movement during transport and during installation of the clutch. For example, it is possible to maintain the ring-shaped element 20 in a predetermined angular position relative to the housing 2 and/or to maintain the clutch spring 4 in a predetermined axial position relative to the adjoining parts and/or to maintain the pressure plate 3 in a predetermined axial position until after the installation of the clutch in a power train is completed. This ensures that the condition of the wear compensating means 12 or analogous wear compensating means upon completion of installation invariably corresponds to that condition which the wear compensating means must assume prior to initial adjustment to compensate for wear upon the friction linings 7 and, if necessary, for wear upon one or more additional parts of the clutch.

The various curves in the diagrams of FIGS. 3 and 4 are indicative of the characteristics of a single set of cooperating energy storing elements including the clutch spring 4, the resilient segments 10 and the element 31. However, it is clear that the improved friction clutch can embody other combinations of such or analogous energy storing elements without departing from the spirit of the invention. For example, it is possible to combine the various energy storing elements in such a way that they generate negative forces during disengagement of the clutch. With reference to the diagram of FIG. 4, this would mean that at least a portion of the curve 59 would extend below the abscissa. Thus, it would be necessary to forcibly disengage the clutch while the bearing 39 covers a certain portion of the overall distance 49 in the direction of the arrow 37. However, this would present no problems because the required disengaging force would be small, or extremely small, so that it could be readily furnished by a small electric motor or another suitable servomotor.

It is further possible to design the clutch in such a way that the energy storing element 31 assists the clutch spring 4 in maintaining the clutch in the engaged condition. Thus, the initial stage of each disengagement of the clutch then involves a movement of the pressure plate 3 axially and away from the counterpressure plate 6 against the resistance of the energy storing element 31, i.e., the element 31 must be tilted to change its conicity in order to be in a position to furnish a force which assists the disengagement of the clutch.

The friction clutch 1 of FIGS. 1 and 2 is a pull type clutch, i.e., the bearing 39 must pull the tips 4c of the prongs 4b in the direction of the arrow 37 in order to effect a disengagement of the clutch. The position of the clutch spring 4 remains unchanged during the entire useful life of the clutch and this, in turn, ensures that the relationship of the clutch spring 4 and the energy storing element 31 to each other also remains at least substantially unchanged during the life of the clutch.

Figure 6:
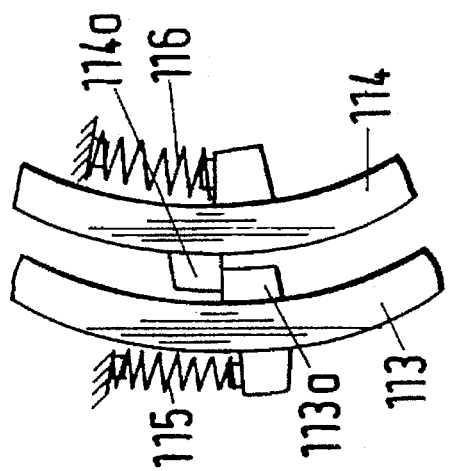
FIG. 6 is a plan view of a detail in the friction clutch of FIG. 5.
Figure 5:
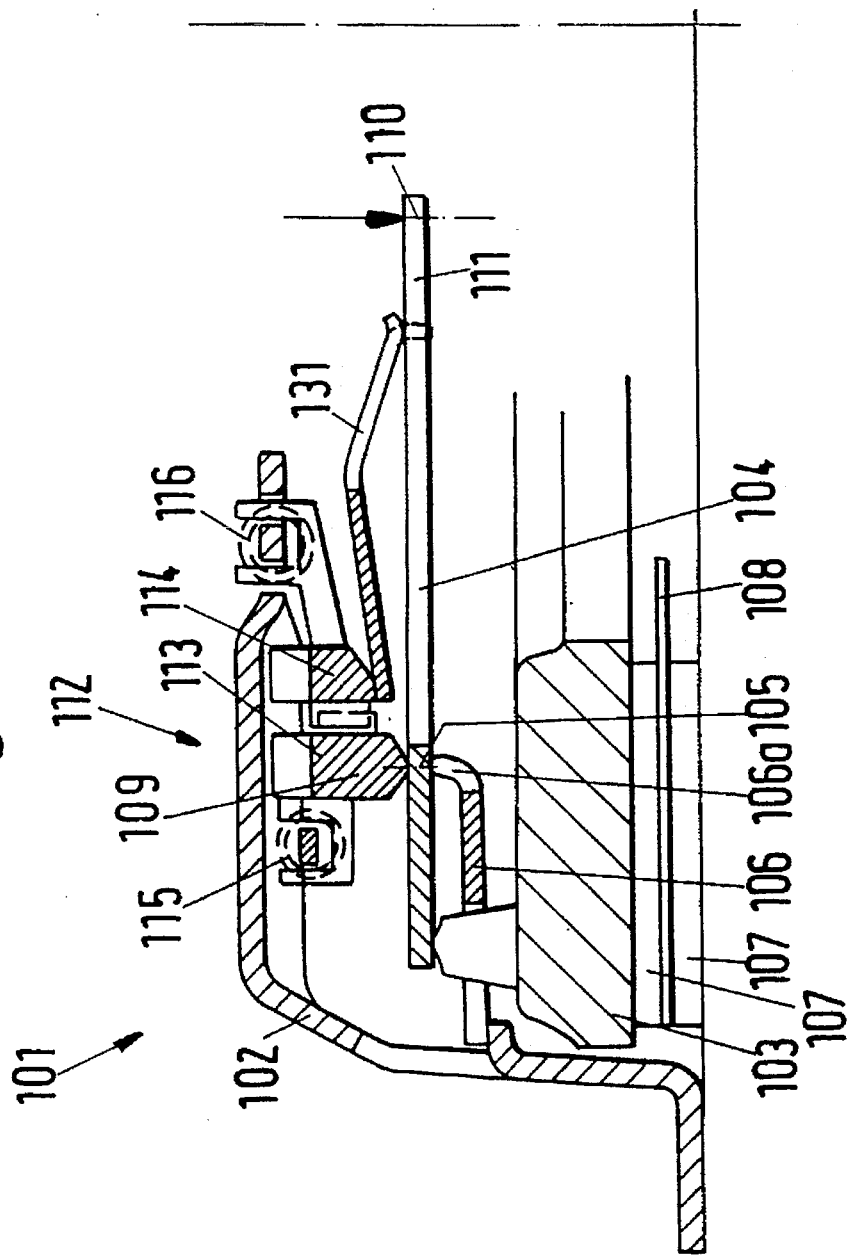
FIG. 5 is a fragmentary axial sectional view of a modified friction clutch.

The situation is different in so-called push type clutches. A portion of one such push type clutch 101 is shown in FIGS. 5 and 6. Since the clutch 101 is provided with wear compensating means 112 and such wear compensating means employs one or more force monitoring sensors, the position of the clutch spring 104 (shown in the form of a diaphragm spring) changes relative to the adjacent parts of the clutch. More specifically, the clutch spring 104 is caused to move axially relative to the housing 102 and the pressure plate 103 of the push type clutch 101. Therefore, it is necessary to ensure that the servo element 131 (shown in the form of a diaphragm spring) also changes its position as the wear upon the friction linings 107 of the clutch disc 108 progresses in order to ensure that the mode of cooperation between the clutch spring 104 and the element 131 remains unchanged.

The clutch spring 104 is installed in stressed condition between the housing 102 and the pressure plate 103 of the friction clutch 101. A circumferentially complete radially outer portion of the clutch spring 104 bears upon the adjacent projections of the pressure plate 103. The housing 102 is non-rotatably connected to a counterpressure plate (not shown in FIGS. 5 and 6) which can receive torque from a suitable prime mover in the same way as described with reference to the counterpressure plate 6 of FIGS. 1 and 2. The pressure plate 103 is non-rotatably but axially movably coupled to the housing 102 and/or to the counterpressure plate in a manner not shown in FIGS. 5 and 6, e.g., by leaf springs corresponding to those shown at 209 in FIG. 9.

The clutch spring 104 can be said to constitute a two-armed lever which is fulcrumed by a seat assembly 105 radially inwardly of the locus of engagement of the clutch spring with the pressure plate 103.

The seat assembly 105 includes or cooperates with a stressed energy storing element 106 shown in the form of a diaphragm spring which reacts against the housing 102 and includes tongues or arms 106a bearing against that side of the clutch spring 104 which confronts the pressure plate 103. The axial force which the spring 106 applies to the clutch spring 104 is selected in such a way that it exceeds the disengaging forces which are normally required to disengage the clutch 101 and are applied to the tips 110 of the radially inwardly extending prongs 111 forming part of the spring 104. The spring 106 performs the function of a sensor which ensures that, during normal disengagement of the clutch 101 (i.e., during normal tilting of the spring 104 at the seat assembly 105), the circumferentially complete radially outer portion of the spring 104 applies a predetermined axial force against an abutment 109 at the inner side of the bottom wall of the housing 102.

The abutment 109 forms part of the wear compensating means 112, and the latter further includes the sensor spring 106. The purpose of the wear compensating means 112 is to change the axial position of the clutch spring 104 relative to the housing 102 to an extent corresponding to the extent of wear at least upon the friction linings 107 of the clutch disc 108. Of course, the wear compensating means can be designed in such a way that it compensates for wear upon the friction linings 107 as well as upon one or more other parts which are likely to or which undergo at least some wear during the useful life of the clutch 101. Such other parts can include, for example, the pressure plate 103 and/or the aforementioned (not illustrated) counterpressure plate.

The wear compensating means 112 further comprises an annular member 113 which can be said to constitute a wear compensating ring. To this end, the member 113 comprises an annulus of ramps which extend in the circumferential direction of the pressure plate 103 and cooperate with complementary ramps provided at the inner side of the bottom wall of the housing 102. The manner in which the ramps of the member 113 cooperate with the ramps of the housing 102 is or can be similar, identical or analogous to that described in connection with the ramps 22, 23 of the wear compensating means 12 shown in FIGS. 1 and 2. The wear compensating means 112 still further comprises a second annular member 114 which is also provided with circumferentially extending ramps cooperating with ramps provided at the inner side of the bottom wall of the housing 102.

The circumferentially complete radially outer portion of the energy storing element 131 bears against the second annular member 114 of the wear compensating means 112. The tongues constituting the radially inner portion of the energy storing element 131 abut the adjacent prongs 111 of the clutch spring 104.

The annular members 113, 114 are biased in the circumferential direction of the pressure plate 103 by resilient elements in the form of coil springs 115, 116. The arrangement is such that the annular members 113, 114 are installed to operate in series and the annular member 113 constitutes a brake for the annular member 114. More specifically, the annular member 113 serves to prevent uncontrolled angular movements of the annular member 114 relative to the housing 102. As can be seen in FIG. 6, the members 113, 114 are provided with radially extending projections 113a, 114a which cooperate to prevent further angular movement of the member 114 relative to the member 113 in a counterclockwise direction, as viewed in FIG. 6. The annular member 114 and the coil spring(s) 116 (reacting against the housing 102 and bearing against the member 114) cooperate to ensure that the axial position of the energy storing element 131 is changed in response to changes of the axial position of the clutch spring 104 relative to the housing 102, i.e., those changes in the axial position of the clutch spring 104 which are necessary in view of the progessing wear upon the friction linings 107. Each axial displacement of the clutch spring 104 entails an angular movement of the annular member 113 through a distance which is a function of the extent of wear upon the friction linings 107 (or of the extent of wear subsequent to the preceding compensation for such wear). The annular member 113 can turn relative to the housing 102 during disengagement of the clutch 101; at such time, the energy storing element 131 exerts an axially oriented force upon the annular member 114 so that the latter is (temporarily) held against rotation relative to the housing 102. During such stage of disengagement, the projection or projections 113a of the annular member 113 moves or move away from the projection(s) 114a of the annular member 114. During the next-following engagement of the clutch 101, the clutch spring 104 reassumes the orientation (conicity) which is shown in FIG. 5, and this entails a stressing of the energy storing element 131. This, in turn, entails a drop of axial force which is furnished by the energy storing element 131; this axially oriented force can be reduced to a minimum value or even to zero. Therefore, the prestressed spring or springs 116 can turn the annular member 114 relative to the housing 102 until the projection (s) 114a catch up and abuts or abut the projection(s) 113a of the annular member 113. This ensures that the energy storing element 131 completes the required axial movement as determined by the axial displacement of the clutch spring 104, and the thus axially adjusted element 131 is also subjected to the same stress as before.

The construction and the mode of operation of the wear compensating means 112 in the friction clutch 101 are or can be similar, identical or analogous to those disclosed in the published German patent applications Serial Nos. 42 39 291 and 42 39 289. The disclosures of these German patent applications, as well as of all previously enumerated German patent applications (or of the corresponding pending United States patent applications and/or United States patents) are also incorporated herein by reference.

Figure 8:
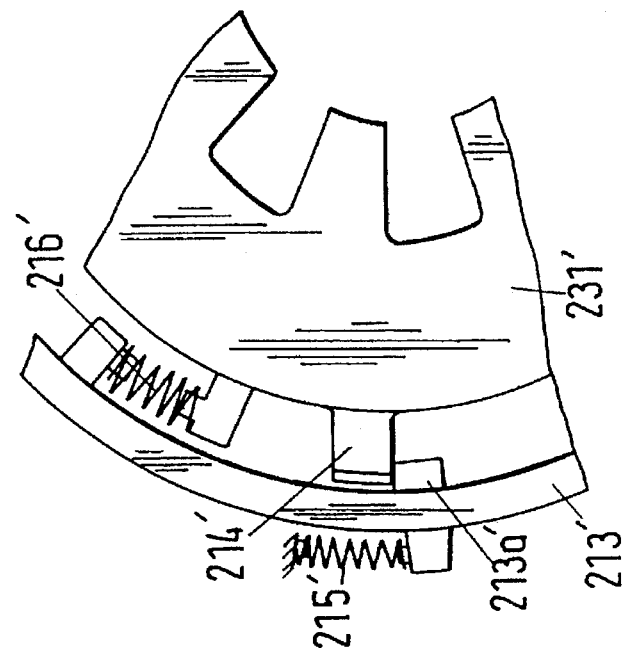
FIG. 8 is a plan view of a detail in the friction clutch of FIG. 7.
Figure 7:
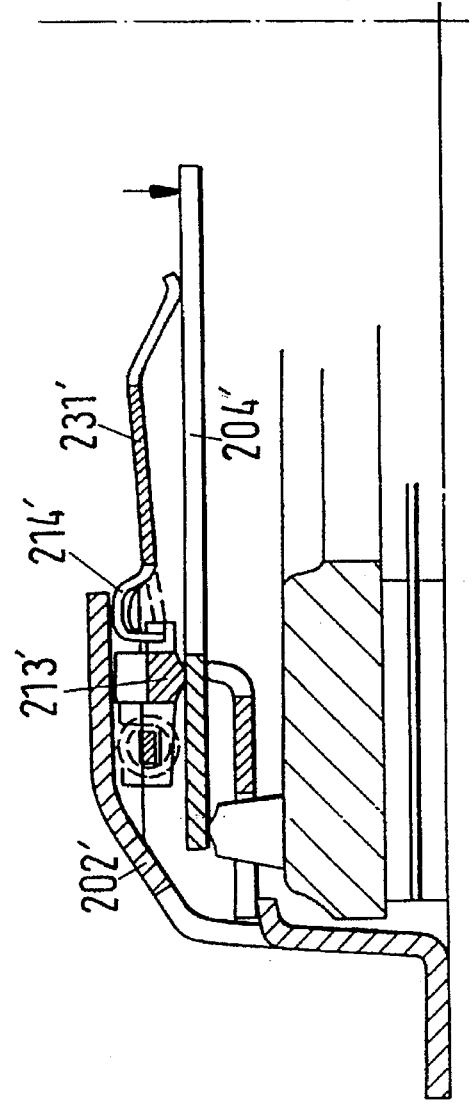
FIG. 7 is a fragmentary axial sectional view of a third friction clutch.

FIGS. 7 and 8 illustrate a portion of another push type friction clutch wherein the annular member 114 of the wear compensating means 112 of FIGS. 5 and 6 is incorporated into an energy storing element 231' which further performs the functions of the element 131. The element 231' is basically a diaphragm spring having a circumferentially complete annular radially outer portion and radially inwardly extending prongs. The radially outer portion of the element 231' is provided with ramps 214' which cooperate with complementary ramps at the inner side of the bottom wall of the housing 202' of the friction clutch of FIGS. 7 and 8. The ramps 214' are of one piece with the element 231' and are obtained by shifting selected sections from the general plane of the radially outer portion of such element. The non-referenced complementary ramps can be of one piece with the bottom wall of the housing 202'. However, it is equally within the purview of the invention to employ separately produced ramps 214' which are welded, riveted or otherwise affixed to the energy storing element 231' and/or to employ separately produced complementary ramps which are welded, riveted and/or otherwise affixed to the bottom wall of the housing 202'.

The ramps 214' further perform the function of the projections 114a shown in FIG. 6 in that they cooperate with projections 213a' of the annular member 213' forming part of the wear compensating means in the clutch of FIGS. 7 and 8. FIG. 8 further shows energy storing elements in the form of coil springs 215', 216' which respectively bias the annular member 213' and the element 231' in the circumferential direction of the housing 202'. The wear compensating action is carried in a manner clearly analogous to that described for the wear compensating means 112 in the friction clutch 101 of FIGS. 5 and 6. The main difference between the wear compensating means 112 and the wear compensating means including the structure shown in FIGS. 7 and 8 is that the energy storing element 231' can be rotated relative to the housing 202' as well as relative to the clutch spring 204'.

FIG. 9 shows a push type friction clutch 201 having a housing or cover 202 which is is fixedly secured to a rotary counterpressure plate 206 by screws, bolts or other suitable threaded or unthreaded fasteners. The radially outer portion of the counterpressure plate 206 carries a starter gear and its central portion is bolted and/or otherwise affixed to the output element (e.g., a camshaft or a crankshaft) of a prime mover (such as a combustion engine in a motor vehicle).

The clutch 201 further comprises a pressure plate 203 which is non-rotatably affixed to the housing 202 by leaf springs 209 so that it has some freedom of movement in the direction of the common axis X—X of the housing and the counterpressure plate 206. When the clutch 201 is engaged, the pressure plate 203 is biased by a clutch spring 204 (shown in FIG. 9 in the form of a diaphragm spring) which causes the confronting sides or faces of the plates 203, 206 to remain in requisite frictional contact with the external surfaces of the respective friction linings 207 forming part of a clutch disc or clutch plate 208. The latter further comprises resilient segments 210 which are installed between the friction linings and perform or can perform the same functions as the resilient segments 10 in the friction clutch 1 of FIGS. 1 and 2.

The clutch spring 204 is tiltable relative to a seat assembly 205 which is carried by the housing 202. The leaf springs 209 extend substantially tangentially of the clutch spring 204 and their end portions are riveted, bolted or otherwise secured to the adjacent portions of the pressure plate 203 and housing 202. The resilient segments 210 of the clutch disc 208 render it possible to achieve a progressive increase of the torque which is being transmitted by the counterpressure plate 206 to the clutch disc 208 during engagement of the friction clutch 201. These resilient segments are flattened, and are thus caused to store energy or to store additional energy, when the pressure plate 203 is moved in the direction of the axis X—X toward the counterpressure plate 206 so that the friction linings 207 are caused to move axially and toward each other to thus cause the segments 210 to undergo at least some deformation.

The assembly 205 comprises two seats 211, 212 flanking the circumferentially complete radially outer portion of the clutch spring 204. The regions of contact between the clutch spring 204 and the projections at the right-hand side of the pressure plate 203 are located radially outwardly of the seat assembly 205. The seat 211 is analogous to the energy storing axially stressed member 106 of the wear compensating means 112 shown in FIGS. 5 and 6; this seat biases the adjacent portion of the clutch spring 204 in the direction of the axis X—X and toward the inner side of the bottom wall of the housing 202. The seat 211 of FIG. 9 includes or constitutes a diaphragm spring 213 or a part which acts not unlike a diaphragm spring.

The other seat 212 of the assembly 205 is mounted on the housing 202 by way of wear compensating means 216. One of the purposes of the wear compensating means 216 is to ensure that, when the seats 211, 212 are caused to move in the direction of the axis X—X toward the pressure plate 203 and the counterpressure plate 206, no undesirable clearance or play will develop between the seat 212 and the housing 202 and/or between the seat 212 and the clutch spring 204.

The friction clutch 201 (or the torque transmitting apparatus including the clutch 201) further comprises an adjusting unit 220 which ensures that the bias reducing means including the prongs 204b of the clutch spring 204 can be actuated (pushed in the direction of the axis X—X) without any play so that they can be repeatedly moved through identical distances in order to disengage the friction clutch 201. The adjusting unit 220 is installed between a release (pusher) bearing 220a (which also forms part of the bias reducing means) and the prongs 204b.

The exact details of friction clutches corresponding to the friction clutch 201 of FIG. 9, of wear compensating means which can be utilized (as the means 216) in the clutch 201, and of an adjusting unit (which can be used as or in lieu of the adjusting unit 220) are disclosed in several aforementioned patents and/or applications. Reference may be had in particular to the aforementioned published German patent application Serial No. 43 22 677.

The clutch 201 further comprises an energy storing element 231 which is a diaphragm spring installed between the housing 202 and an axially movable member 230 of the adjusting unit 220. The member 230 is part of a ring which serves as a means for limiting the extent of axial movability of the free end portions or tips of prongs 204b forming part of the clutch spring 204. The energy storing element 231 serves to transmit a clutch disengaging force and its radially inner portion is tiltably mounted on the ring including the member 230 and bears against the latter in the direction of the axis X—X. The radially outer portion of the energy storing element 231 abuts against the housing 202 in the direction of the axis X—X and is tiltable relative to the housing.

The conicity of the energy storing element 231 changes when the clutch 201 is being disengaged, i.e., when the bearing 220a is moved toward the counterpressure plate 206. The manner in which the force which is generated by the energy storing element 231 assists in disengagement of the clutch 201 is analogous to that described for the energy storing element 31 of FIGS. 1 and 2 in connection with the diagrams of FIGS. 3 and 4. The force which is furnished by the element 231 assists the disengagement of the clutch 201 at least during a certain portion or stage of disengagement. At such time, the element 231 bears against the ring including the member 230 in the direction of the axis X—X, and the ring including the member 230 transmits such force to the tips of the prongs 204b forming part of the clutch spring 204.

A compensating ring 230a is installed between the ring including the member 230 and the clutch spring 204 to compensate for axial displacement of the clutch spring.

In those embodiments of the improved clutch which are shown in FIGS. 1–2, 5–6, 7–8 and 9, the energy storing elements 31, 131, 231' and 231 are installed in or are directly combined with or integrated into the respective friction clutches. However, it is equally possible to employ one or more springs or like parts which perform the function of the energy storing element 31, 131, 231' or 231 and are not installed in or incorporated into the respective friction clutches. For example, an energy storing element which assists in disengagement of the clutch can be installed in or combined with the clutch disengaging mechanism, namely a mechanism including that part or those parts which initiate the disengagement of the clutch by applying forces to certain constituents of the clutch proper, such as to the prongs 4b of the clutch spring 4 in the clutch 1 of FIGS. 1 and 2. The disengaging mechanism or unit can include any one or any two or more of a number of different components, for example, at least one, two or more of the parts including master cylinders, slave cylinders, disengaging bearings, fluid-operated (hydraulic or pneumatic) adjusters, electric motors, motion transmitting linkages, motion or power transmitting conduits and/or conductors, Bowden wires, actuating levers, and/or depressible and/or otherwise movable pedals.

All of the illustrated and/or otherwise described embodiments of the improved friction clutch exhibit the advantage that they overcome at least some drawbacks of heretofore known friction clutches regarding the facility, accuracy, predictability and reproducibility of disengagement during the entire useful life of such clutches. Thus, the improved friction clutch is designed and assembled in such a way that it can be disengaged in response to the application of relatively small forces (at least during a substantial portion or stage of the disengaging operation) and/or that the magnitude of the disengaging force remains at least substantially constant or fluctuates within a surprisingly narrow range in the course of the entire disengaging operation or at least during a substantial part of such operation. The disengaging force to be applied need not exhibit any pronounced peaks and the ratio of the maximum required disengaging force to the minimum disengaging force is much lower than in connection with the manipulation of conventional friction clutches; as a rule, such ratio does not exceed and can be much less than 1.5. All of the above outlined advantages can be achieved by resorting to a relatively simple, compact, inexpensive and durable friction clutch.

It is further within the purview of the invention to employ manually operable wear compensating means to be actuated from time to time in order to compensate for wear upon the friction linings of the clutch disc but preferably also for wear upon the pressure plate, the counterpressure plate, the clutch spring and/or the housing of the friction clutch. However, the automatically operated wear compensating means are preferred because they need not be attended to during the entire life span of the clutch.

If the clutch spring of the improved friction clutch is a diaphragm spring and the energy storing element performing the function of the element 31, 131, 231' or 231 is also a diaphragm spring, the energy storing element can resemble but can be weaker than the clutch spring.

If the resilient segments 10 or 210 or their equivalents are omitted, i.e., if no such segments are built into the clutch disc proper, the friction clutch can employ functional equivalents of such segments at one or more other locations rather than between the friction linings. For example, functional equivalents of the segments 10 or 210 can be installed to operate between the clutch spring and the pressure plate.

The improved friction clutch is susceptible of numerous additional modifications without departing from the spirit of the invention. For example, the various features which are shown in FIGS. 1–2, 5–6, 7–8 and 9 can be used interchangeably or in a number of combinations with each other. Furthermore, the novel features of the illustrated and aforedescribed friction clutches can be incorporated in many types of conventional clutches to thus enable the modified conventional clutches to exhibit the aforediscussed advantages. Still further, applicant reserves the right to seek and obtain patent protection for combinations of certain elements of the improved friction clutch and/or for certain individual novel elements of such clutch. Additional novel and patentable features are believed to reside in a method of enhancing the operation of a friction clutch for the purpose of disengaging the clutch disc or clutch plate from the pressure plate and the counterpressure plate in response to the application of relatively small disengaging forces and/or in response to the application of disengaging forces which fluctuate within a narrow range (if at all).

Last but not least, the invention is believed to reside in the provision of a torque transmitting apparatus which employs the aforedescribed friction clutch or other friction clutches in conjunction with one or more energy storing elements corresponding to the element 31, 131, 231' or 231, and/or in a combination of a friction clutch with a clutch disengaging mechanism which employs one or more equivalents of the energy storing element 31, 131, 231' or 231.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art and, therefore, such adaptations should and are intended to be comprehended within the meaning and range of equivalence of the appended claims.

What is claimed is:

1. An engageable and disengageable friction clutch, comprising a housing rotatable about a predetermined axis; means for rotating said housing including a counterpressure plate rotatable about said axis; a pressure plate coaxial and rotatable with and disposed between said housing and said counterpressure plate and movable in the direction of said axis; a clutch disc coaxial with and disposed between said plates and being subject to wear upon repeated progressing frictional contact and progressing reduction of frictional contact with said plates in response to axial movement of said pressure plate toward and away from said counterpressure plate; means for engaging the clutch including at least one clutch spring arranged to bias said pressure plate against said clutch disc in the engaged condition of the clutch; means for reducing the bias of said at least one spring upon said pressure plate to thus disengage the clutch; at least one at least temporarily stressed energy storing element operative in parallel with said at least one spring to generate forces promoting at least in part the disengagement of the clutch; and means for automatically compensating for wear at least upon said clutch disc.

2. The clutch of claim 1, wherein said pressure plate is movable within limits in the direction of said axis and said counterpressure plate includes a part arranged to receive torque from a prime mover, said clutch disc including friction linings which are subject to wear and are contacted by said plates in the engaged condition of the clutch.

3. The clutch of claim 1, wherein said at least one energy storing element is constructed and installed to exhibit a progressive force-to-distance characteristic at least during a portion of movement of said pressure plate to disengage the clutch.

4. The clutch of claim 1, wherein said at least one energy storing element includes a diaphragm spring.

5. The clutch of claim 1, wherein said at least one clutch spring includes a diaphragm spring.

6. The clutch of claim 1, wherein said at least one clutch spring includes an annular portion and prongs extending from said annular portion substantially toward said axis and forming part of said means for reducing the bias of said at least one clutch spring upon said pressure plate.

7. The clutch of claim 1, wherein said at least one clutch spring has a degressive force-to-distance characteristic at least during a portion of movement of said pressure plate away from said counterpressure plate.

8. The clutch of claim 1, wherein said pressure plate covers a predetermined distance during movement away from said counterpressure plate to disengage the clutch and said distance includes a first portion and a second portion, said pressure plate applying to said clutch disc a decreasing force during movement through said first portion of said distance and said clutch disc being spaced apart from said plates during movement of said pressure plate through said second portion of said distance, said at least one energy storing element exhibiting a positive force-to-distance characteristic during movement of said pressure plate through said first portion of said distance.

9. The clutch of claim 8, wherein said at least one energy storing element is operative to generate forces promoting the disengagement of the clutch during movement of said pressure plate through the entire first portion of said predetermined distance.

10. The clutch of claim 8, wherein said at least one energy storing element is operative to generate forces tending to promote the disengagement of the clutch during a part of movement of said pressure plate through said second portion of said predetermined distance.

11. The clutch of claim 1, wherein said at least one energy storing element bears, at least indirectly, against one of said housing and said bias reducing means and reacts, at least indirectly, against the other of said housing and said bias reducing means.

12. The clutch of claim 1, wherein said at least one energy storing element bears, at least indirectly, against one of said housing and said at least one clutch spring and reacts, at least indirectly, against the other of said housing and said at least one clutch spring.

13. The clutch of claim 1, wherein said at least one energy storing element is stressed in the engaged condition of the clutch without exerting an appreciable force in the direction of said axis.

14. The clutch of claim 1, wherein said at least one energy storing element is stressed in the engaged condition of the clutch and exerts in the direction of said axis a force which increases at least during at least one stage of disengagement of the clutch.

15. The clutch of claim 1, wherein said at least one energy storing element is arranged to be subjected to a stress which varies between a maximum stress and a minimum stress, said at least one energy storing element having a substantially sinusoidal force-to-distance characteristic curve and being subjected to a stress which is at least close to said minimum stress in the engaged condition of the clutch.

16. The clutch of claim 1, wherein said at least one energy storing element is stressed in the engaged condition of the clutch to generate a force in the direction of said axis.

17. The clutch of claim 1, wherein said clutch disc includes first and second friction linings which are contacted by said plates in the engaged condition of the clutch, and are resilient means disposed between and urging said first and second friction linings away from each other in the direction of said axis.

18. The clutch of claim 1, wherein said at least one energy storing element comprises a diaphragm spring and further comprising means for tiltably mounting said diaphragm spring on said housing.

19. The clutch of claim 18, wherein said diaphragm spring includes a radially outer portion which is tiltably mounted on said housing.

20. The clutch of claim 1, wherein said at least one energy storing element includes a diaphragm spring having a radially inner portion acting upon said bias reducing means.

21. An engageable and disengageable friction clutch, comprising a housing rotatable about a predetermined axis; means for rotating said housing including a counterpressure plate rotatable about said axis; a pressure plate coaxial and rotatable with and disposed between said housing and said counterpressure plate and movable within limits in the direction of said axis; a clutch disc coaxial with and disposed between said plates and having friction linings subject to wear upon repreated progressing frictional contact and progressing reduction of frictional contact with said plates in response to axial movement of said pressure plate toward and away from said counterpressure plate; means for moving said pressure plate including at least one first diaphragm spring arranged to bias said pressure plate against said clutch disc in the engaged condition of the clutch; means for reducing the bias of said at least one first diaphragm spring upon said pressure plate to thus disengage the clutch; at least one stressed second diaphragm spring operative in parallel with said at least one first diaphragm spring to generate forces promoting at least in part the disengagement of the clutch; and means for automatically compensating for wear at least upon said friction linings, including means for adjusting the bias of said at least one first diaphragm spring upon said pressure plate.

22. The clutch of claim 21, wherein said at least one second diaphragm spring is constructed and installed to exhibit a progressive force-to-distance characteristic at least during a portion of movement of said pressure plate to disengage the clutch.

23. The clutch of claim 21, wherein said at least one first diaphragm spring comprises an annular portion and prongs extending from said annular portion substantially toward said axis and forming part of said means for reducing the bias of said at least one first diaphragm spring upon said pressure plate.

24. The clutch of claim 21, wherein said at least one first diaphragm spring has a degressive force-to-distance characteristic at least during a portion of movement of said pressure plate away from said counterpressure plate.

25. The clutch of claim 21, wherein said pressure plate covers a predetermined distance during movement away from said counterpressure plate to disengage the clutch and said distance includes a first portion and a second portion, said pressure plate applying to said clutch disc a decreasing force during movement through said first portion of said distance and said clutch disc being spaced apart from said plates during movement of said pressure plate through said second portion of said distance, said at least one second diaphragm spring exhibiting a positive force-to-distance characteristic during movement of said pressure plate through said first portion of said distance.

26. The clutch of claim 25, wherein said at least one second diaphragm spring is operative to generate forces promoting the disengagement of the clutch during movement of said pressure plate through the entire first portion of said distance.

27. The clutch of claim 25, wherein said at least one second diaphragm spring is operative to generate forces tending to promote the disengagement of the clutch during a part of movement of said pressure plate through said second portion of said distance.

28. The clutch of claim 21, wherein said at least one second diaphragm spring bears, at least indirectly, against one of said housing and said bias reducing means and reacts, at least indirectly, against the other of said housing and said bias reducing means.

29. The clutch of claim 21, wherein said at least one second diaphragm spring bears, at least indirectly, against one of said housing and said at least one first diaphragm spring and reacts, at least indirectly, against the other of said housing and said at least one first diaphragm spring.

30. The clutch of claim 21, wherein said at least one second diaphragm spring is stressed in the engaged condition of the clutch without exerting a force in the direction of said axis.

31. The clutch of claim 21, wherein said at least one second diaphragm spring is stressed in the engaged condition of the clutch and exerts in the direction of said axis a force which increases at least during at least one stage of disengagement of the clutch.

32. The clutch of claim 21, wherein said at least one second diaphragm spring is arranged to be subjected to a stress which varies between a maximum stress and a minimum stress, said at least one second diaphragm spring having a substantially sinusoidal force-to-distance characteristic curve and being subjected to a stress which is at least close to said minimum stress in the engaged condition of the clutch.

33. The clutch of claim 21, wherein said at least one second diaphragm spring is stressed in the engaged condition of the clutch to generate a force in the direction of said axis.

34. The clutch of claim 21, wherein said clutch disc further comprises resilient means disposed between and urging said friction linings away from each other in the direction of said axis.

35. The clutch of claim 21, further comprising means for tiltably mounting said at least one second diaphragm spring on said housing.

36. The clutch of claim 35, wherein said at least one second diaphragm spring includes a radially outer portion which is tiltably mounted on said housing.

37. The clutch of claim 21, wherein said at least one second diaphragm spring includes a radially inner portion acting upon said bias reducing means.

38. An engageable and disengageable friction clutch, comprising a housing rotatable about a predetermined axis; means for rotating said housing including a counterpressure plate rotatable about said axis; a pressure plate coaxial and rotatable with and disposed between said housing and said counterpressure plate and movable within limits in the direction of said axis; a clutch disc coaxial with and disposed between said said plates and having friction linings subject to wear upon repeated progressing frictional contact and progressing reduction of frictional contact with said plates in response to axial movement of said pressure plate toward and away from said counterpressure plate; means for moving said pressure plate including at least one first energy storing element arranged to bias said pressure plate against said clutch disc in the engaged condition of the clutch; means for reducing the bias of said at least one first energy storing element upon said pressure plate to thus disengage the clutch; at least one second energy storing element operative in parallel with said at least one first energy storing element to generate forces promoting the disengagement of the clutch; resilient means disposed between said friction linings and also operative to generate forces promoting the disengagement of the clutch; and means for automatically compensating for wear at least upon said friction linings.

39. The clutch of claim 38, wherein said at least one second energy storing element is constructed and installed to exhibit a progressive force-to-distance characteristic at least during a portion of movement of said pressure plate to disengage the clutch.

40. The clutch of claim 38, wherein said at least one second energy storing element includes a diaphragm spring.

41. The clutch of claim 38, wherein said at least one first energy storing element includes a diaphragm spring.

42. The clutch of claim 38, wherein said at least one first energy storing element includes an annular portion and prongs extending from said annular portion substantially toward said axis and forming part of said means for reducing the bias of said at least one first energy storing element upon said pressure plate.

43. The clutch of claim 38, wherein said at least one first energy storing element has a degressive force-to-distance characteristic at least during a portion of movement of said pressure plate away from said counterpressure plate.

44. The clutch of claim 38, wherein said pressure plate covers a predetermined distance during movement away from said counterpressure plate to disengage the clutch and said distance includes a first portion and a second portion, said pressure plate applying to said clutch disc a decreasing force during movement through said first portion of said distance and said clutch disc being spaced apart from said plates during movement of said pressure plate through said second portion of said distance, said at least one second energy storing element exhibiting a positive force-to-distance characteristic during movement of said pressure plate through said first portion of said distance.

45. The clutch of claim 44, wherein said at least one second energy storing element is operative to generate forces promoting the disengagement of the clutch during movement of said pressure plate through the entire first portion of said distance.

46. The clutch of claim 44, wherein said at least one second energy storing element is operative to generate forces tending to promote the disengagement of the clutch during a part of movement of said pressure plate through said second portion of said predetermined distance.

47. The clutch of claim 38, wherein said at least one second energy storing element bears, at least indirectly, against one of said housing and said bias reducing means and reacts, at least indirectly, against the other of said housing and said bias reducing means.

48. The clutch of claim 38, wherein said at least one second energy storing element bears, at least indirectly, against one of said housing and said at least one first energy storing element and reacts, at least indirectly, against the other of said housing and said at least one first energy storing element.

49. The clutch of claim 38, wherein said at least one second energy storing element is stressed in the engaged condition of the clutch without exerting any appreciable force in the direction of said axis.

50. The clutch of claim 38, wherein said at least one second energy storing element is stressed in the engaged condition of the clutch and exerts in the direction of said axis a force which increases at least during at least one stage of disengagement of the clutch.

51. The clutch of claim 38, wherein said at least one second energy storing element is arranged to be subjected to a stress which varies between a maximum stress and a minimum stress, said at least one second energy storing element having a substantially sinusoidal force-to-distance characteristic curve and being subjected to a stress which is at least close to said minimum stress in the engaged condition of the clutch.

52. The clutch of claim 38, wherein said at least one second energy storing element is stressed in the engaged condition of the clutch to generate a force in the direction of said axis.

53. The clutch of 38, wherein said resilient means includes at least one spring which biases said friction linings away from each other in the direction of said axis.

54. The clutch of claim 38, wherein said at least one second energy storing element comprises a diaphragm spring and further comprising means for tiltably mounting said diaphragm spring on said housing.

55. The clutch of claim 54, wherein said diaphragm spring includes a radially outer portion which is tiltably mounted on said housing.

56. The clutch of claim 38, wherein said at least one second energy storing element includes a diaphragm spring having a radially inner portion acting upon said bias reducing means.

\* \* \* \* \*